(12) United States Patent
Tanizoe et al.

(10) Patent No.: US 7,948,531 B2
(45) Date of Patent: May 24, 2011

(54) IMAGING APPARATUS AND CORRECTION METHOD OF IMAGE DATA

(75) Inventors: Yukihiro Tanizoe, Osaka (JP);
Yasutoshi Yamamoto, Osaka (JP);
Yoshimasa Okabe, Osaka (JP);
Hiromasa Funakoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 1078 days.

(21) Appl. No.: 11/201,537

(22) Filed: Aug. 11, 2005

(65) Prior Publication Data

US 2006/0092283 A1    May 4, 2006

(30) Foreign Application Priority Data

Aug. 24, 2004   (JP) .................................. 2004-243351
Aug. 26, 2004   (JP) .................................. 2004-246708

(51) Int. Cl.
*H04N 5/217*     (2006.01)
*H04N 9/64*      (2006.01)
*H04N 5/225*     (2006.01)
*H01L 27/00*     (2006.01)

(52) U.S. Cl. ... 348/241; 348/243; 348/248; 348/207.99; 250/208.1

(58) Field of Classification Search .................. 348/241, 348/207.9, 243, 248; 250/208.1
See application file for complete search history.

(56) References Cited

U.S. PATENT DOCUMENTS

| | | | |
|---|---|---|---|
| 5,272,536 A * | 12/1993 | Sudo et al. ..................... | 348/243 |
| 5,528,291 A | 6/1996 | Oda | |
| 5,608,455 A | 3/1997 | Oda | |
| 6,965,410 B1 * | 11/2005 | Yamagishi ..................... | 348/362 |
| 7,092,017 B2 * | 8/2006 | Kelly et al. .................... | 348/241 |
| 7,196,725 B1 | 3/2007 | Saigusa et al. | |
| 7,339,620 B1 * | 3/2008 | Yamagishi et al. ........... | 348/243 |
| 2001/0042817 A1 * | 11/2001 | Harada ....................... | 250/208.1 |
| 2001/0055067 A1 * | 12/2001 | Wada ............................ | 348/241 |
| 2003/0071906 A1 | 4/2003 | Matsumoto | |
| 2004/0028286 A1 | 2/2004 | Saigusa et al. | |
| 2004/0189837 A1 * | 9/2004 | Kido ............................ | 348/241 |
| 2005/0243193 A1 * | 11/2005 | Gove et al. .................... | 348/241 |

FOREIGN PATENT DOCUMENTS

| | | |
|---|---|---|
| EP | 0 957 628 A2 | 11/1999 |
| JP | 5-091417 | 4/1993 |
| JP | 6-54261 | 2/1994 |
| JP | 8-307775 | 11/1996 |
| JP | 2000-152098 A | 5/2000 |
| JP | 2001-138869 A | 5/2000 |
| JP | 2001-094882 A | 4/2001 |
| JP | 2001-177762 A | 6/2001 |
| JP | 2003-101860 A | 4/2003 |
| JP | 2004-007048 A | 1/2004 |
| JP | 2005-227984 | 12/2010 |

* cited by examiner

*Primary Examiner* — David L Ometz
*Assistant Examiner* — Quang V Le
(74) *Attorney, Agent, or Firm* — RatnerPrestia

(57) ABSTRACT

An imaging apparatus is provided for reducing noise which is derived from random noise contained in a correction signal used for correcting an image data and is newly generated on correction of the image data. The imaging apparatus drives vertical transfer registers with no signal charge from photoelectric transducers read out to the vertical transfer registers to obtain and store a correction signal into a field memory. The apparatus subtracts the correction signal from the image data by a subtractor.

11 Claims, 26 Drawing Sheets

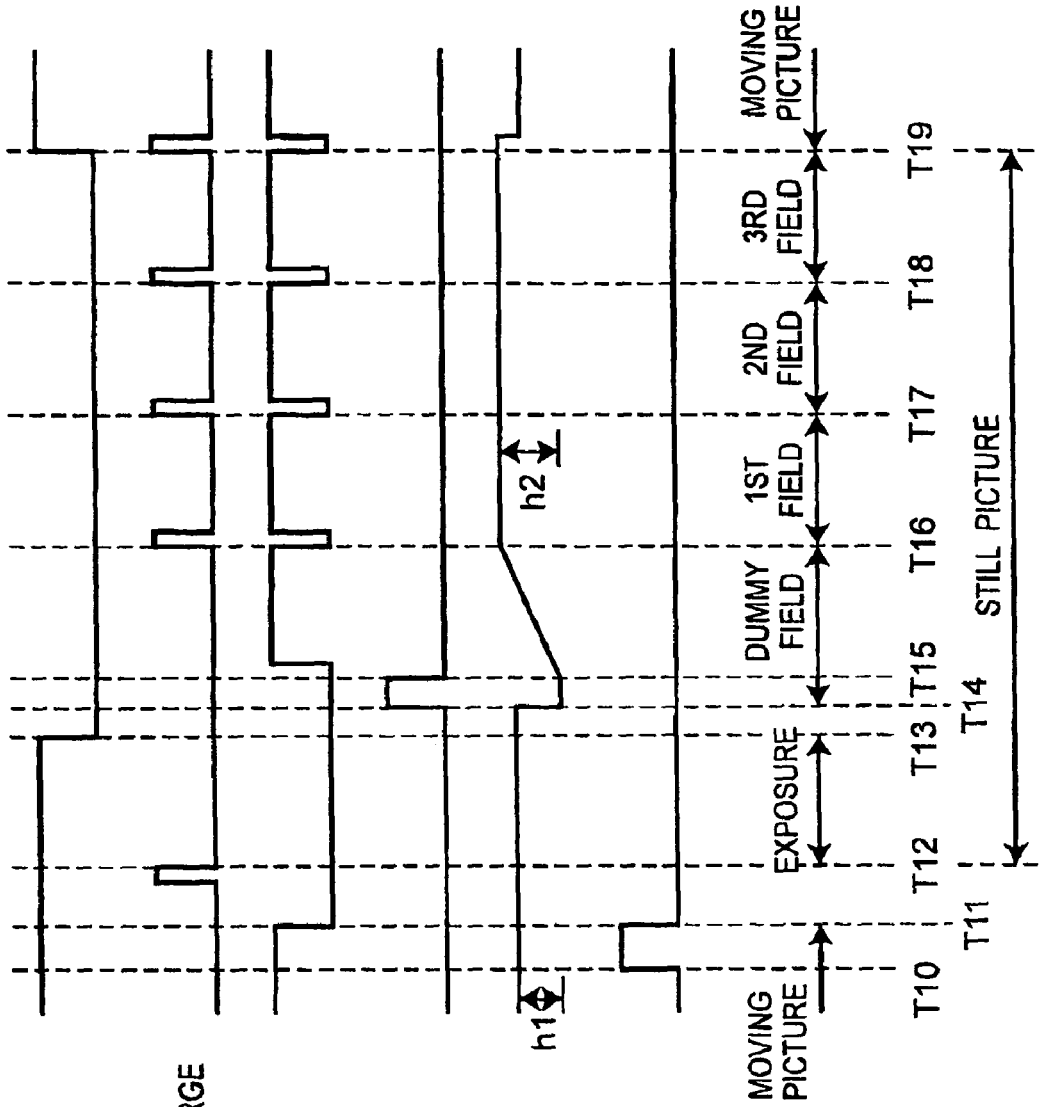

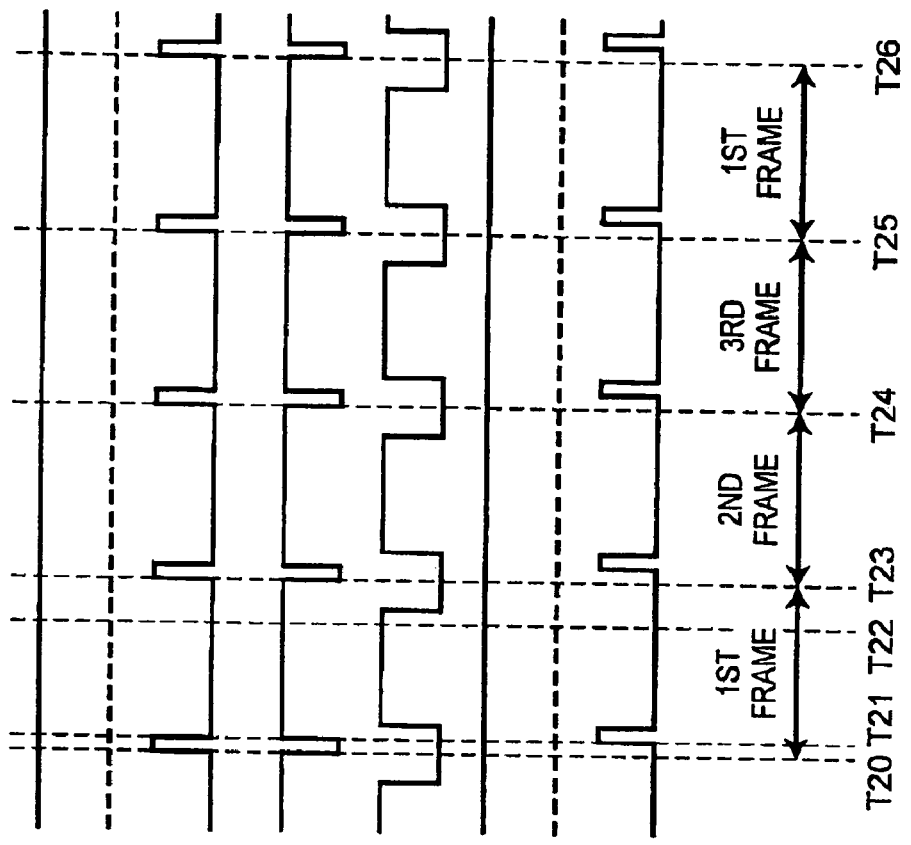

IMAGING APPARATUS AND CORRECTION METHOD OF IMAGE DATA

TECHNICAL FIELD

The present invention relates to an imaging apparatus having a function of reducing fixed pattern noise from image data generated in a photoelectric transducer and obtained through a vertical transfer register, and a denoising method thereof, and more particularly to denoising of fixed pattern noise derived from electric charge generated in the vertical transfer register.

RELATED ART

Hitherto, as the imaging apparatus and method for reducing noise generated in CCD image sensor, for example, the technology disclosed in patent document 1 has been known. As disclosed in the patent document 1(**), a subject image is projected by CCD image sensor to obtain image data, and a vertical transfer register is driven without emitting light to the CCD image sensor to obtain black level information, and the image data is corrected by subtracting the black level information from the image data.

In this prior art, by driving the vertical transfer register without emitting light to the CCD image sensor, black level information can be obtained, and by subtracting this black level information from the image data, noise is removed to obtain true image data.

Black level information used in this subtraction process is stored in a frame memory. Black level information has information of each pixel in one frame. In correction, for each pixel, black level information is subtracted from information of each pixel in image data, and therefore the storage capacity of storage means for storing and holding black level information should be large enough to store image data of one frame.

Noise generated in CCD image sensor can be classified into fixed pattern noise (FPN) and random noise. The fixed pattern noise is noise which is caused by fluctuation of characteristic of each pixel and generated when the image data is displayed on screen. This noise appears at a fixed position on the image. By contrast, the random noise appears regardless of position on the image.

Noise generated in CCD image sensor can be also classified into noise component caused by electric charge generated in a photoelectric transducer and noise component caused by electric charge generated in a vertical transfer register. In this specification, for the sake of convenience, noise component caused by electric charge generated in a photoelectric transducer is called "element noise component", while noise comment caused by electric charge generated in a vertical transfer register is called "transfer noise component". Fixed pattern noise of the transfer register noise component is called "transfer fixed noise component". Dark current generated in the vertical transfer register is main factor of the transfer fixed noise component.

Black level information in this prior art described is the information obtained by electric charge reading out from the photoelectric transducer and ordinary vertical transfer without the CCD image sensor exposed. Hence it contains fixed pattern noise and random noise, and also contains element noise component and transfer noise component.

Therefore, the prior art appears to be excellent because these noise components can be rejected simultaneously by subtracting the black level information from the image information.

**Patent document 1: JP 06-54261 A

However, the above method may not be preferable because the random noise is also subtracted thus causing new noise. More specifically, if random noise is included in black level information, random noise may not be always included in the image data. Random noise appears occasionally at various positions. When random noise is included in the black level information, noise is subtracted from the image data potentially not including the noise, and new noise may be generated by subtraction.

SUMMARY OF THE INVENTION

It is hence an object of the invention to present an imaging apparatus capable of reducing noise caused by random noise contained in a correction signal for correcting image data, that is, noise newly generated on correction of mage data.

In a first aspect of the invention, provided is an imaging apparatus including imaging section that has a plurality of photoelectric transducers disposed in matrix, and a plurality of vertical transfer registers each disposed adjacently to each row of photoelectric transducers for transferring signal charge from the photoelectric transducer, a storage section that stores a correction signal obtained by driving the vertical transfer registers with no signal charge read from the photoelectric transducers to vertical transfer registers, and a subtractor that subtracts the correction signal from the image data obtained by driving the vertical transfer registers with the signal charge read from the photoelectric transducers to vertical transfer registers.

In this configuration, the correction signal is obtained by driving the vertical transfer registers without reading out the signal charge from the photoelectric transducers to vertical transfer registers. Thus the correction signal does not include electric charge generated in the photoelectric transducers or the other hand, random noise is much contained in electric charge generated in photoelectric transducers. Hence, the invention can reduce the noise derived from the random noise contained in the correction signal, which is newly generated on correction of image data.

The imaging apparatus of the invention, when dividing one frame of image data into a plurality of fields and obtaining an image signal in each field, may obtain a correction signal by driving the vertical transfer register for a period of one field.

According to this configuration, the correction signal can be generated by reading signals for one field. Thus compared with the prior art of generating a correction signal by reading out one frame, the time for generating a correction signal can be shortened. As the correction signal, only data of one field portion is stored and held, the storage section for storing the correction signal may be smaller in storage capacity. Specifically, the capacity of the storage section should be larger than the capacity corresponding to one field of image data, and smaller than that corresponding to two fields of image data.

In the imaging apparatus of the invention, the storage section may be a line memory for storing a correction signal for one line. In this case, the image data is obtained by driving the vertical transfer register at the same speed as when the correction signal is obtained, successively after driving the vertical transfer register for obtaining the correction signal.

In this configuration, transfer fixed noise component can be constant in each row of the output image. Accordingly, the transfer fixed noise component can be eliminated by using a correction signal of one line. Therefore, the storage section for storing a correction signal can be reduced in storage capacity.

Further more, in this case, a correction signal for one line may be obtained by averaging or weighted averaging of dummy signals of a plurality of lines obtained by driving the vertical transfer register without reading out the signal charge from the photoelectric transducer to the vertical transfer register.

The imaging apparatus of the invention may further include a low pass filter for passing low frequency components of dummy signals directly obtained from the imaging section by driving the vertical transfer register without reading out signal charge from the photoelectric transducer to the vertical transfer register, in which the correction signal is obtained from the output of the low pass filter. In this configuration, random noise component is prevented from being contained in the correction signal.

Moreover, in the imaging apparatus of the invention, the imaging section may include a shielding section for shielding light. In this case, the correction signal is obtained by driving the vertical transfer register after sweeping out smear charge on the vertical transfer register with the imaging section shielded by the shielding means. In this configuration, mixture of smear or dark current generated during exposure into the correction signal can be prevented. It is also effective to prevent generation of smear while driving the vertical transfer register to mix into the correction signal.

The imaging apparatus of the invention may further include a temperature sensor for detecting temperature and/or a gain controller for controlling the gain of output of imaging section. In this case, on the basis of the temperature detected by the temperature sensor and/or the gain by the gain controller, necessity of the correction of image data with the correction signal may be determined. Or the magnitude of the correction signal may be increased or decreased on the basis of the temperature detected by the temperature sensor and/or magnitude of the gain by the gain controller. In this configuration, depending on necessity of correction, it is decided whether or not to correct, or the magnitude of correction signal can be determined. Therefore while necessity of correction is low, side effects due to correction such as extending of imaging time or generation of new noise can be avoided.

The imaging apparatus of the invention nay have a continuous shooting mode of taking image data of a plurality of frames continuously. In this case, in the continuous shooting node, as a correction signal for subtracting from the image data of the present frame, the correction signal used in the previous frame may be used. In this configuration, a dummy field period can be eliminated when imaging the present frame, and hence the imaging period may be shortened.

A second aspect of the invention provides an imaging apparatus including an imaging section, a correction signal generating section, a storage section, and a subtractor.

The imaging section has a plurality of photoelectric transducers arranged in matrix, and a plurality of vertical transfer registers each of which is disposed adjacently to each row of photoelectric transducers for transferring signal charge from the photoelectric transducers, the imaging section outputting moving pictures by alternately repeating image data output operation of outputting image data by driving the vertical transfer registers with no signal charge read out from the photoelectric transducers to vertical transfer registers, and dummy signal output operation of outputting dummy signals by driving the vertical transfer registers with the signal charge read out from the photoelectric transducers to the vertical transfer registers. The correction signal generating section generates a correction signal on the basis of a dummy signal detected by a dummy signal output operation of the imaging section. The storage section stores the generated correction signal. The subtractor subtracts the correction signal from the image data output by the image data output operation.

In this configuration, the correction signal is obtained by driving the vertical transfer registers without reading out the signal charge from the photoelectric transducers to vertical transfer registers, and thus the correction signal does not include electric charge generated in the photoelectric transducers. On the other hand, random noise is much contained in electric charge generated in photoelectric transducers. It is hence effective to reduce the noise derived from the random noise contained in the correction signal, that is, the noise newly generated at the time of correction of image data.

The imaging section may receive reading pulses output periodically, and read out signal charge from the photoelectric transducer to the vertical transfer register every time receiving the reading pulse, thereby performing the image data output operation and the dummy signal output operation. In this configuration, the dummy signal can be obtained every time receiving the reading pulse, so that the correction signal may be generated frequently.

The correction signal generating section may be also comprised to generate a correction signal by calculating average or weighted average of a plurality of output dummy signals depending on the reading pulse received at different timings. In this configuration, the correction signal is generated on the basis of the dummy signals obtained at different timings, and thus a stable correction signal can be obtained if the dummy signals fluctuate somewhat every time receiving the reading pulse.

The imaging apparatus of the invention may be designed to divide the image data of one frame of moving picture into a plurality of fields, and the imaging section may perform the image data output operation and the dummy signal output operation every time driving the vertical transfer register periodically in one field. In this configuration, since the dummy signal can be obtained in each field, a correction signal suited to each field can be generated.

Further, the correction signal generating section may be also composed to generate a correction signal by calculating average or weighted average of plural dummy signals output in different fields. In this configuration, the correction signal is generated on the basis of dummy signals obtained in different fields, a stable correction signal can be obtained even if dummy signals fluctuate somewhat in each field.

The storage section may update the correction signal by a newly generated correction signal every time the correction signal generating means generates a correction signal. In this configuration, the storage section is not needed to store the correction signal generated previously, reducing storage capacity.

The apparatus may further include change amount detecting section for detecting the change amount between the level of dummy signal output previously from the imaging section and the level of dummy signal output this time. In this case, the storage section may not update the correction signal if the change amount detected by the change amount detecting section exceeds a predetermined value. In this configuration, if smear occurs in dummy signal and level of dummy signal exceeds a specific value, the correction signal in the storage section is not updated, and adverse effect of smear on correction signal can be prevented. Therefore, if smear mixes into dummy signal, generation of new noise in image data can be prevented.

The imaging apparatus may further include level detecting section for detecting the level of the dummy signal output from the imaging section. In this case, the storage section may not update the correction signal if the level detected by the level detecting section exceeds a predetermined value. In this configuration, if smear occurs in the dummy signal and level of the dummy signal exceeds a predetermined value, the correction signal in the storage section is not updated, and adverse affect of smear on correction signal can be prevented. Therefore, if smear mixes into dummy signal, generation of new noise in image data can be prevented.

The imaging apparatus of the invention may further include a temperature sensor for detecting temperature and/or a gain controller for controlling a gain of output of imaging section. In this case, on the basis of the temperature detected by the temperature sensor and/or the gain by the gain controller, necessity of the correction of image data by the correction signal may be determined. Or the magnitude of the correction signal may be increased or decreased on the basis of the temperature detected by the temperature sensor and/or magnitude of the gain by the gain controller. In this configuration, depending on necessity of the correction, it is decided whether or not to correct, or the magnitude of the correction signal can be determined, and therefore while necessity of the correction is low, adverse affects due to the correction such as extending of imaging time or generation of new noise can be avoided.

The imaging apparatus of the invention may be also an imaging apparatus capable of taking both moving pictures and still pictures. In this case, it may further include a multiplier for multiplying the correction signal generated by the correction signal generating section and stored in the storage section when taking a moving picture, by a predetermined value, and generating a correction signal for still picture, or a subtractor may be provided for subtracting a correction signal for a still picture from the image data output by the image data discharge operation when taking a still picture. In this configuration, while taking a still picture, image data can be corrected using the correction signal used when taking a moving picture, and hence it is not necessary to generate the correction signal for still picture. Therefore, time for generating the correction signal is not needed, and the time of taking a still picture can be shortened.

A third aspect of the invention provides an imaging apparatus including imaging section, a correction signal generating section, storage section, and subtractor.

The imaging section has a multiplicity of photoelectric transducers disposed in matrix, a reading region disposed adjacently to each row of photoelectric transducers for reading out signal charge from the photoelectric transducers, a dummy region not capable of reading out signal charge from the photoelectric transducers, and a plurality of vertical transfer registers for transferring signal charge being read out in the reading region. The correction signal generating section generates a correction signal on the basis of dummy signal by obtaining the electric charge generated in the dummy region as dummy signal by driving the vertical transfer register. The storage section stores the generated correction signal. The subtractor subtracts the correction signal by obtaining the signal charge being read out in the reading region as image data by driving the vertical transfer register. In this configuration, the dummy region can read out only the signal charge from the photoelectric transducers, and element noise component is not contained in dummy signal.

The imaging apparatus of the invention can reduce the noise derived from random noise contained in correction signal for correcting image data, that is, the noise newly generated at the time of correction of image data.

BRIEF DESCRIPTION OF THE DRAWINGS

FIGS. 25A to 25G are timing charts of operation timing in still picture shooting mode of the imaging apparatus in the ninth embodiment of the invention.

FIGS. 26A to 26G are timing charts of operation timing of an imaging apparatus in the tenth embodiment of the invention.

DETAILED DESCRIPTION OF PREFERRED EMBODIMENTS

Preferred embodiments of the invention are specifically described below while referring to accompanying drawings.
Outline 1 of the Invention
First of all, outline of a configuration of an imaging apparatus in the first to fourth embodiments of the invention is explained. The imaging apparatus of the invention drives vertical transfer registers without reading out signal charge from the photoelectric transducers of a CCD image sensor to vertical transfer registers of the CCD image sensor. In this method, a correction signal is obtained and then subtracted from the image data which is obtained by driving the vertical transfer register while the signal charge is read from the photoelectric transducer to the vertical transfer register. By driving the vertical transfer register without reading out the signal charge from the photoelectric transducer to the vertical transfer register, noise derived from the photoelectric transducer is now contained in the electric charge transferred by the vertical transfer register. Accordingly, a correction signal mainly composed of transfer noise components is obtained. By subtracting it from the image data, the transfer noise component is eliminated, and the image data can be corrected.

Of the transfer noise components, the noise derived from transfer fixed noise component is described. Transfer fixed noise components are added and averaged during vertical transfer, and hence it may be a uniform offset on the entire image if the time is constant in all pixels from the moment being read out by the vertical transfer register until output. By contrast, if this time differs in each horizontal line, it appears as fixed pattern noise changing in vertical direction. Besides, along with a miniaturization of the CCD image sensor, fluctuation of dark current in each vertical transfer register cannot be ignored. Then such fluctuating transfer fixed noise component is vertically transferred, noise level varies in each row, and fixed pattern noise appears as vertical stripes.

The imaging apparatus in the first to fourth embodiments reduces such fixed pattern noise in vertical stripes in still pictures.

First Embodiment 1-1 Configuration of Imaging Apparatus

Figure 1:
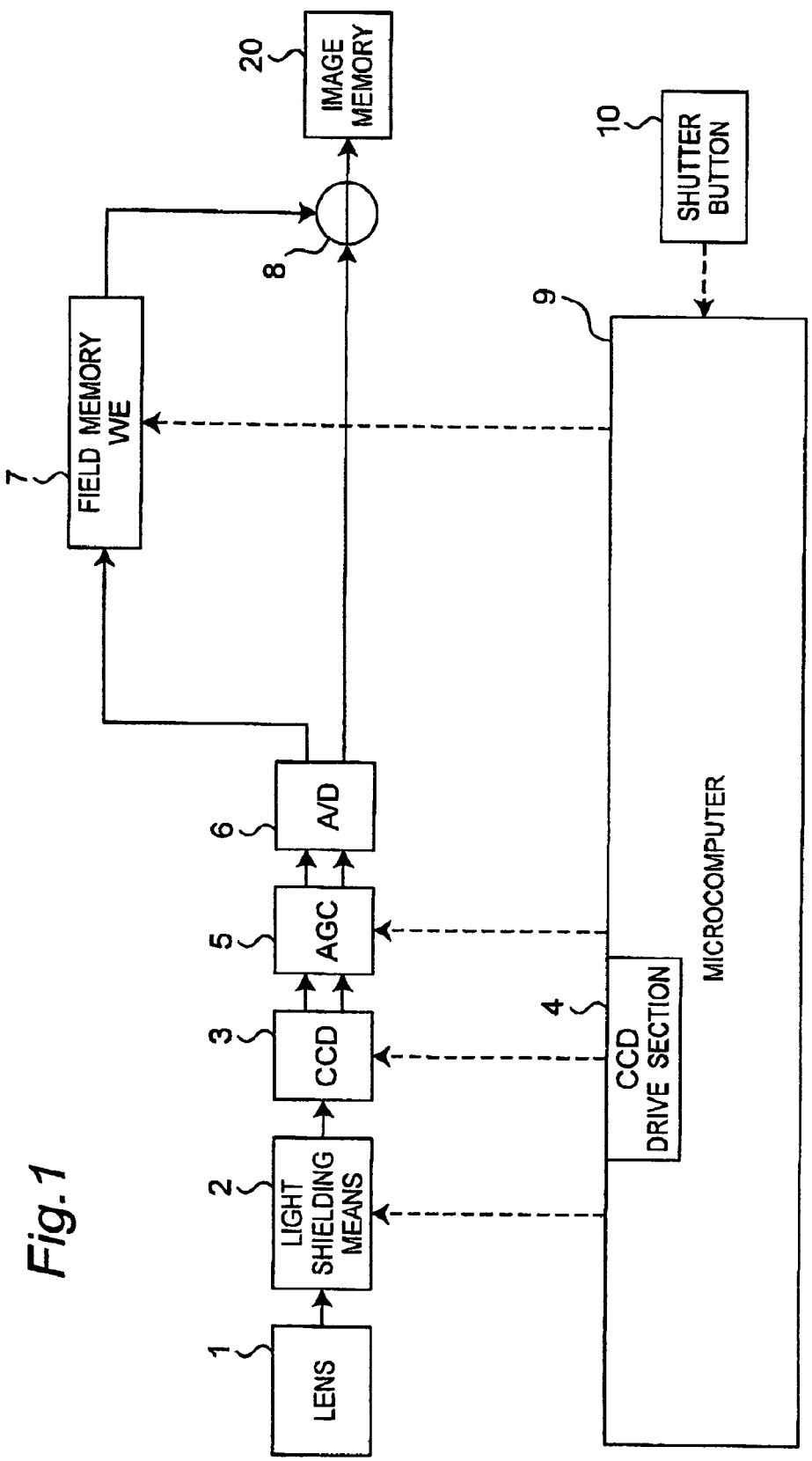
FIG. 1 is a block diagram of configuration of an imaging apparatus in the first embodiment of the invention.

FIG. 1 is a block diagram of configuration of imaging apparatus in the first embodiment of the invention.

The imaging apparatus converts an optical signal of an image collected by a lens 1 into an electrical signal by a CCD image sensor 3 to generate image data. The optical signal collected by the lens 1 can be shielded (light-shielded) by a light shielding means 2. The light shielding means 2 is, for example, a mechanical shutter. The generated image data is put into an automatic gain control (AGC) 5 in which the gain is adjusted, and is further sent into an A/D converter 6 to be digitized. A field memory 7 stores a correction signal. A subtractor 8 subtracts the correction signal stored in the field memory 7, from the image data digitized by the A/D converter 6. The image data thus coming out from the subtractor 8 has been deprived of transfer noise component by the correction signal, and is hence high in image quality. The image data output from the subtractor 8 is stored in an image memory 20.

A microcomputer 9 is control means for controlling the shielding means 2, CCD image sensor 3, AGC 5, field memory 7 and others, and controlling the operation of the entire imaging apparatus.

Figure 2:
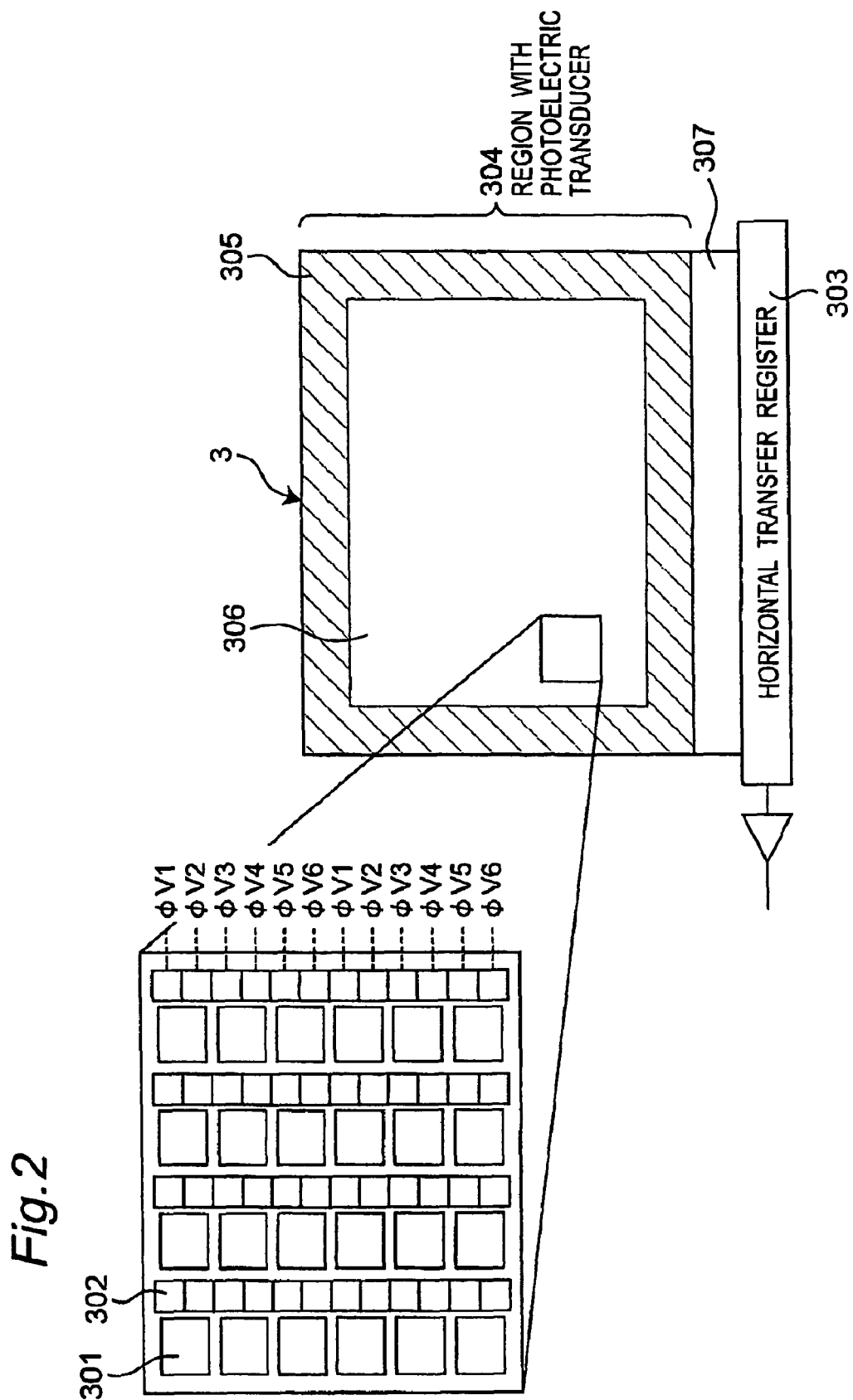
FIG. 2 is a schematic diagram of configuration of a CCD image sensor in embodiments 1 to 4 of the invention.

The configuration of the CCD image sensor 3 is explained. FIG. 2 is a schematic diagram of configuration of the CCD image sensor. The CCD image sensor 3 includes a plurality of photoelectric transducers 301 disposed in matrix, and a plurality of vertical transfer registers 302 disposed adjacently to each row of photoelectric transducers 301 for transferring a signal charge. The CCD image sensor 3 also has a horizontal transfer register 303 for transferring a signal charge transferred from the vertical transfer register 302 in the horizontal direction.

In this example, one photoelectric transducer 301 has two vertical transfer registers 302. The vertical transfer registers 302 have electrodes disposed so as to provide same potential change in all lines. The electric charge accumulated in adjacent photoelectric transducers 301 is read out in the vertical transfer registers 302, and provided with change in potential ($\phi$V1 to V6) in several types of drive pattern in the vertical direction, and transferred in the vertical direction, and finally output from the horizontal transfer register 303. Depending on the drive pattern given to the vertical transfer registers 302, the electric charge reading method varies, and hence noise appearing manner changes.

The CCD image sensor 3 also has a region 304 in which the photoelectric transducers 301 are present. The CCD image sensor 3 may also have a dummy region 307 not having photoelectric transducer 301, on the side of the horizontal transfer register 303. The region 304 containing the photoelectric transducer 301 includes an image forming region 306, and a peripheral light-shielding region 305. The shielding region 305 is used for detecting an optical black level. The CCD image sensor 3 is an example of imaging means.

The imaging apparatus of the embodiment divides one frame of the image data into plural fields. For example, an image composed of first, fourth, seventh, and other (3n−2) lines of photoelectric transducer 301 is a first field, an image composed of second, fifth, eighth, . . . and (3n−1) lines is a second field, and an image composed of third, sixth, ninth, . . . , and 3n lines is a third field (n being a positive integer). The CCD image sensor used in a digital still camera and others is advanced in the number of pixels, and if all pixels of one frame are read out at once, and transferred vertically by the vertical transfer resister 302. The number of required vertical transfer registers 302 is increased, and it takes time from reading of signal charge until completion of transfer. In the imaging apparatus of the embodiment, in order to solve this problem, data is divided into a plurality of fields, and image data of one frame is read out. The invention is not limited to this example, but may be also applied in an imaging apparatus for reading out image data of one frame without dividing into a plurality of fields.

1-2 Operation in Single Shooting Mode

Figure 3:
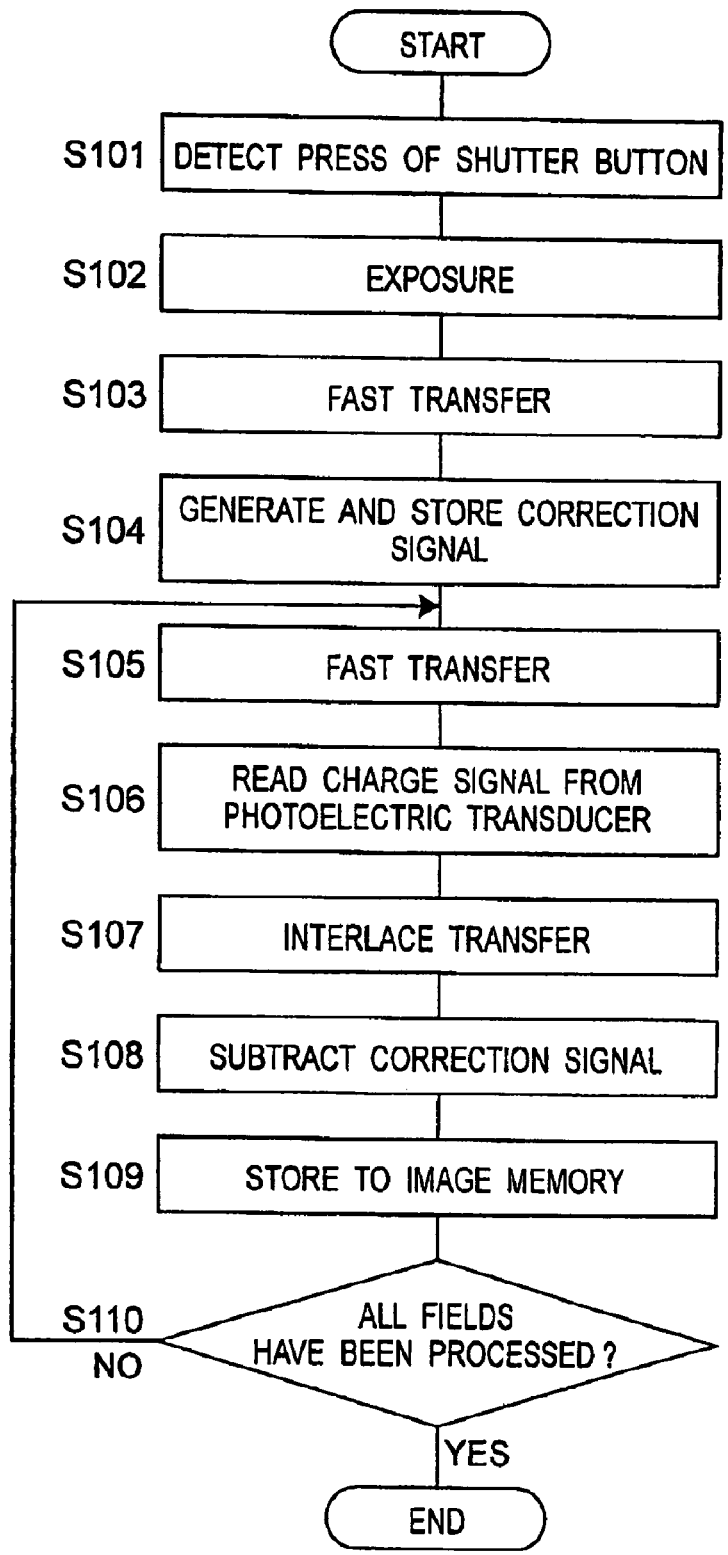
FIG. 3 is a flowchart of operation of the imaging apparatus in the first embodiment of the invention.
Figure 4:
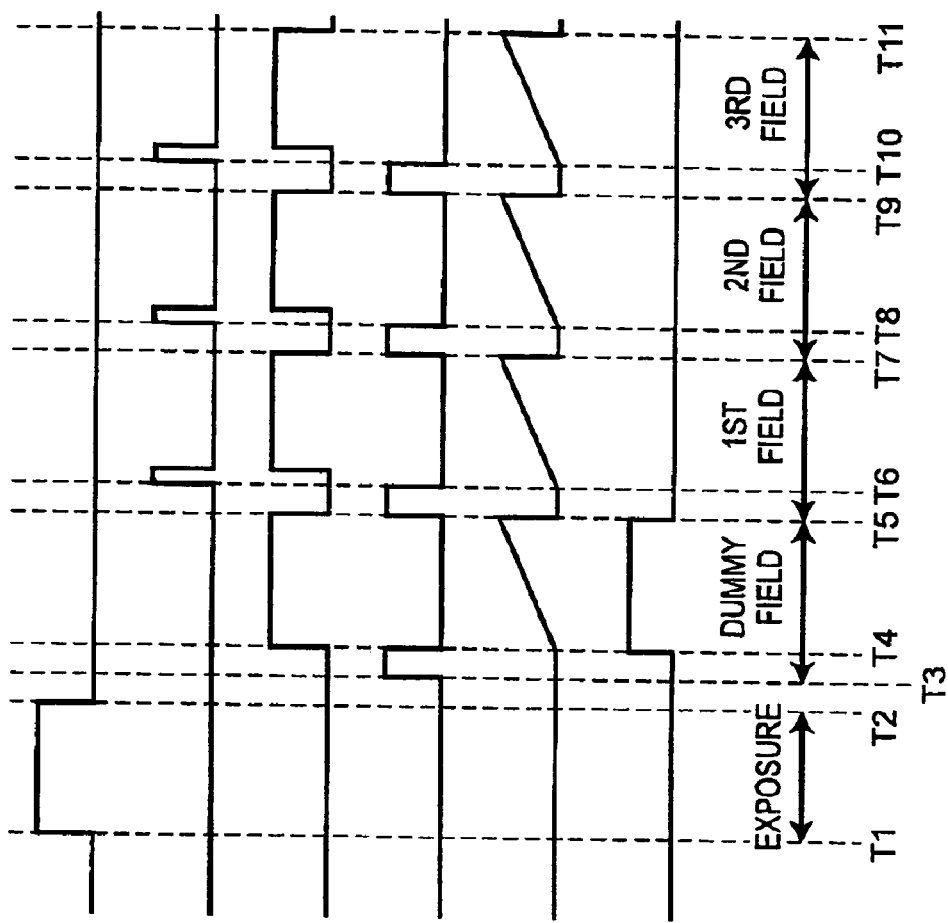
FIGS. 4A to 4G are timing charts of operation timing of the imaging apparatus in the first embodiment of the invention.
Figure 5:
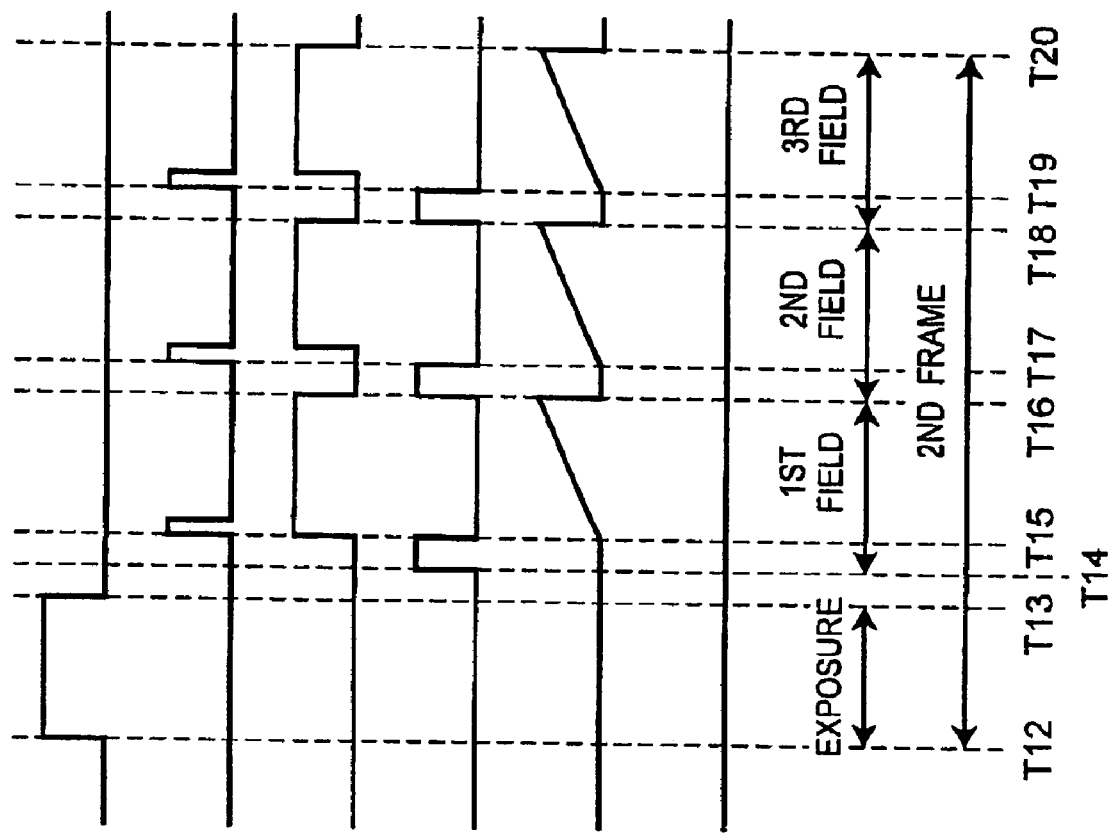
FIGS. 5A to 5G are timing charts of operation aiming in continuous shooting mode of the imaging apparatus in the first embodiment of the invention.

Of the operations of the imaging apparatus of the embodiment, an operation of shooting (taking) one image is explained by referring to FIGS. 3 and 4 (It is called "single shooting node".). An operation mode of shooting plural images continuously in time is called "continuous shooting mode".

FIG. 3 is a flowchart of operation of imaging apparatus in the embodiment. FIGS. 4A to 4G are timing charts of operation timing in this operation. FIG. 4A is a diagram showing the state of shielding means 2, in which high means exposure state, and low means shielded state. FIG. 4B is a timing diagram of reading out electric charge from the photoelectric transducer 301 into the vertical transfer register 302, in which high means reading.

FIG. 4C is a timing diagram of interlace (interline) transfer in vertical transfer register 302, in which high means interlace transfer. FIG. 4D is a timing diagram of vast transfer in vertical transfer register 302, in which high means fast transfer. Fast transfer is transfer for outputting electric charge accumulated in vertical transfer register 302 to be ready for next imaging operation. FIG. 4E is a diagram of values of transfer fixed noise component of any row in one image, schematically shown by representing one image. FIG. 4F shows a write enable (WE) signal for the field memory 7, and the field memory 7 stores the input signal when it is high.

FIG. 4G is a diagram showing operation state of imaging apparatus of the embodiment. A period of time T1 to T2 is a period of exposure operation. Time T3 to T5 is a dummy field period, that is, a period of generating and storing a correction signal. Times T5 to T7, T7 to T9, and T9 to T11 are respectively first, second and third field periods, that is, the periods of generating, correcting and storing image data of first to third fields.

1-2-1 Exposure Period

Exposure period is explained. In FIG. 3, the microcomputer 9 monitors whether a shutter button 10 is pressed or not (S101). When pressed, it controls the shielding means 2 to set in exposure state (S102, T1 in FIGS. 4A to 4G). Exposure continues up to time T2, and when exposure ends, the microcomputer 9 controls the shielding means 2 to set in shielded state. A CCD drive section 4 controls the CCD image sensor 3 to start fast transfer in order to sweep out dark current accumulated in the vertical transfer register 302 during exposure period (S103, T3 to T4 in FIGS. 4A to 4G).

Fast transfer is transfer method of driving the vertical transfer register 302 at high speed in order to sweep out smear or dark current generated in the vertical transfer register 302 in the exposure period.

1-2-2 Dummy Field Period

Dummy field period is explained. In order to read out signal charge for one field without reading out signal charge from the photoelectric transducer 301 to the vertical transfer registers 302, the vertical transfer register 302 is driven by interlace transfer. As a result, signal charge is obtained from the COD image sensor 3, and it is called "a dummy signal". The period for generating a dummy signal is called a dummy field.

The dummy signal is output from the CCD image sensor 3 to the AGC 5, and is further sent into the A/D converter 6. It is digitized in the A/D converter 6, and is stored in the field memory 7 as a correction signal (S104, T4 to T5 in FIGS. 4A to 4G). When storing this correction signal in the field memory 7, the microcomputer 9 outputs a write enable signal to the field memory 7. Accordingly, in the period of time T4 to T5, the write enable signal is high (active) as shown in FIG. 4F.

Transitional changes of transfer fixed noise component shown in FIG. 4E are explained. Main factor of transfer fixed noise component is electric charge generated by dark current as mentioned above. The amount of electric charge increases in proportion to the duration for electric charge of staying on each vertical transfer register 302. Right after fast transfer, the time after transfer is short, and the charge amount on each vertical transfer register 302 is small. Accordingly, right after the reading pulse is output (T4), transfer fixed noise component included in the signal output from the CCD image sensor 3 is small in amount. Later, as the time passes during interline transfer, electric charge by dark current is accumulated in the vertical transfer register 302, and the amount of transfer fixed noise component increases gradually, and finally the amount is maximum in the line output from the CCD image sensor 3. Hence, since the signal is read out first from she upper portion of the image, in the image before correction, noise contained in the image is gradually increased in level as going toward the lower portion of the image.

Since the dummy signal is obtained by driving the vertical transfer register 302 without reading out signal charge from the photoelectric transducer 301 to the vertical transfer register 302, it does not include the signal charge accumulated in the photoelectric transducer 301, but contains only the signal charge generated in the vertical transfer register 302. Therefore, when the image data is corrected by using a correction signal generated on the basis of the dummy signal, the noise derived from the photoelectric transducer 301 is not corrected. Hence, the image derived from the photoelectric transducer 301 is small, and when the noise derived from the vertical transfer register 302 is large, the noise to be corrected can be effectively eliminated, and image data of high quality is obtained.

Since the correction signal can be generated by reading out dummy signal for one field, as compared with the prior art of generating a correction signal by reading out one frame, the time for generating the correction signal can be shortened. As a result, the shutter time lag and imaging interval can be shortened. Image data of each field is nearly the same value about the transfer fixed noise component, and hence there is no problem if the image data of each field is corrected by the correction signal generated on the basis of one field of dummy signal.

As the correction signal, it is enough to store and save data for the portion of one field, the storage means for storing the correction signal may be small in storage capacity. Specifically, the capacity of storage means may be larger than the capacity corresponding to the image data of one field, and may be smaller than the capacity corresponding to the image data of two fields.

As a method of curtailing the storage capacity of storage means for storing the correction data, it has been conventionally proposed to store signals of one row, out of signals obtained by transferring and reading out the signal charge to the vertical transfer register in shielded state, as correction signal. In this method, however, same correction signal is subtracted in each pixel of one line, and it cannot be applied to fixed pattern noise of vertical stripes.

As mentioned above, the correction signal can be obtained by driving the vertical transfer register 302 in fast transfer after sweeping out the smear of vertical transfer register 302 by the CCD image sensor 3 in light-shielded state by the shielding means 2. By this configuration, mixture of smear or dark current generated during exposure into correction signal can be prevented. It is also possible to prevent generation of smear while driving the vertical transfer register 302 to mix into the correction signal.

1-2-3 First to Third Field Periods

First to third field periods are explained. After the dummy field period, the CCD drive section 4 drives the CCD image sensor 3 to start fast transfer (S105, T5 to T6 in FIGS. 4A to 4G). By this fast transfer, dark current accumulated in the vertical transfer register 302 is swept out. Later, the CCD drive section 4 drives the CCD image sensor 3 for reading out signal charge into the vertical transfer register 302 from the photoelectric transducer 301 (S106, T6 in FIGS. 4A to 4G). The signal charge being read out into the vertical transfer register 302 is transferred by interlacing by the vertical transfer register 302, and further sent from the CCD image sensor 3 to the AGC 6 through horizontal transfer register 303 (S107). This signal charge is digitized by the A/D converter 6 as image data. Then the subtractor 8 subtracts the correction signal stored in the field memory 7 from the digitized image data. Finally, the image data being rid of noise is stored in the image memory 20.

By such subtracting process, the transfer noise component can be eliminated from the image data obtained from the CCD image sensor 3. More specifically, image data before noise elimination of each field contains noise derived from electric charge generated in the vertical transfer register 302. Noise derived from the electric charge generated in the vertical transfer register is same as the dummy signal explained above. Accordingly, by subtracting the correction signal being read out from the field memory 7 from the image data of each field by the subtractor 8, transfer noise component can be eliminated.

After executing this process to the image data of one field, the microcomputer 9 checks this process is done in the image data of one frame, that is, three fields image data for the portion of, and the process returns to a step S105 if all fields are not finished, and then the image data of second field and third field is generated, corrected and stored (T7 to T9, T9 to T11 in FIGS. 4A to 4G). On the other hand, when all fields are finished (after processing of third field), the process is terminated.

1-3 Operation in Continuous Shooting Mode

Operation in continuous shooting mode is explained. Continuous shooting mode is an operation mode of taking a plurality of frames of image data continuously. FIGS. 5A to 5G are timing charts of operation timing in continuous shooting mode of imaging apparatus. FIGS. 5A to 5G correspond to FIGS. 4A to 4G. FIGS. 5A to 5G show only the operation timing when imaging the second frame in imaging operation of a plurality of frames. Operation timing of imaging the first frame in continuous shooting mode is same as operation timing of imaging in single shooting mode, and hence its explanation is omitted.

In continuous shooting mode, after imaging of the first frame, the first frame of image data with transfer noise component removed is stored in the image memory 20, and the correction signal generated in the dummy field period during imaging of the first frame is stored in the field memory 7. This state is same as the state when finishing the imaging operation in single shooting mode.

In this state, the microcomputer 9 controls the shield means 2 so as to set in exposure state (T12), and transfers to imaging operation of the second frame. When the exposure is over, the microcomputer 9 immediately transfers to the first field period without generating or storing the correction signal (T14). When the fast transfer is finished in the first field period (T15), signal charge is read out from the photoelectric transducer 301 into the vertical transfer register 302 to generate image data. The subtractor 8 subtracts the correction signal stored in the field memory 7 from the image data. Thus, the image data of which transfer fixed noise component is eliminated is stored in the image memory 20. This operation is repeated in the second field and third field.

This operation is same as in the case of imaging of the first frame, but in the case of the second frame, the correction signal used in the first frame is used as a correction signal for the second frame to eliminate the noise. Similarly, when imaging the third frame, the correction signal used in the first and second frames is used. That is, as the correction signal for subtracting from the image data of the present frame, the correction signal used in the preceding frame is used. Such process is possible because the transfer fixed noise component generated in the present frame is nearly same as the transfer fixed noise component generated in the preceding frame.

Not limited to continuous shooting mode, if the value of transfer fixed noise component is nearly the same between the present imaging frame and preceding imaging frame, the same correction signal can be used, and dummy field period is eliminating when imaging the present frame, so that the imaging period may be shortened. In particular, continuous shooting interval between frames can be shortened in the continuous shooting mode.

1-4 Summary

The imaging apparatus of the embodiment includes a CCD image sensor 3 having a multiplicity of photoelectric transducers 301 disposed in matrix, and a plurality of vertical transfer registers 302 each of which is disposed adjacently to each row of photoelectric transducers 301 for transferring signal charge, a field memory 7 for storing a correction signal obtained by driving the vertical transfer registers 302 without reading out the signal charge from the photoelectric transducers 301 to vertical transfer registers 302, and a subtractor 8 for subtracting the correction signal from the image data obtained by driving the vertical transfer registers 302 by reading out the signal charge from the photoelectric transducers 301 to vertical transfer registers 302. In this configuration, it is effective to reduce the noise newly occurring at the time of correction of image data due to random noise contained in she correction signal. This point is more specifically described below.

As described above, if random noise is subtracted from image data, it may lead to generation of new noise. The random noise is noise (element noise component) much generated in the photoelectric transducer 301. It may be hence considered to subtract only transfer fixed noise from the image data, and not to subtract element noise component. In such case, however, the fixed pattern noise occurring in the photoelectric transducer 301 cannot be corrected.

Therefore, from the viewpoint of improvement of picture quality, one of the two methods below should be selected properly.

Not to subtract element noise component, thereby preventing generation of new noise due to random noise contained in a correction signal.

To subtract element noise component, thereby correcting fixed pattern noise generated in photoelectric transducers.

This point is further discussed below by considering the recent situation. As the CCD image sensor 3 is miniaturized recently, the rate of transfer fixed noise becomes larger. This is because the area of photoelectric transducer 301 is becoming smaller, and the output charge amount of photoelectric transducer is also smaller, but the rate of decrease of transfer fixed noise component is smaller than the rate of decrease of output charge amount of photoelectric transducer. As a result, even in the condition not requiring correction conventionally, it is needed to correct transfer fixed noise component.

Magnitude of fixed noise component contained in the imaging element output is determined by the temperature if the vertical transfer speed is the same. The higher the temperature, the greater becomes the transfer fixed noise component. On the other hand, the element noise component is determined by the cumulative time (exposure time) in addition to the temperature. For example, when shooting a night scene, by exposing for a long time, the element noise component increases. Therefore, condition requiring the correction is different between the transfer fixed noise component and element noise component.

For instance, if correction of transfer fixed noise component is needed at high temperature, correction of element noise component may not be needed if the exposure time is short. In spite of this, if the element noise component is corrected in the condition not requiring correction of element noise component, new noise may be generated due to random noise in the element noise component.

Accordingly, under the condition not requiring correction of element noise component, electric charge generated in the photoelectric transducer 301 is prevented from being contained in the correction signal, thereby reducing noise newly occurring at the time of correction of image data due to random noise contained in the correction signal.

Second Embodiment 2-1 Outline of Imaging Apparatus

The imaging apparatus in the second embodiment of the invention generates transfer fixed noise component of specific size in vertical direction of image, and eliminates such noise by using correction signal for one line. In the first embodiment, one field of data is used as a correction signal. But in the second embodiment, one line of data is used, and thus the storage capacity of storage means for storing correction signal can be further smaller.

2-2 Configuration of Imaging Apparatus

Figure 6:
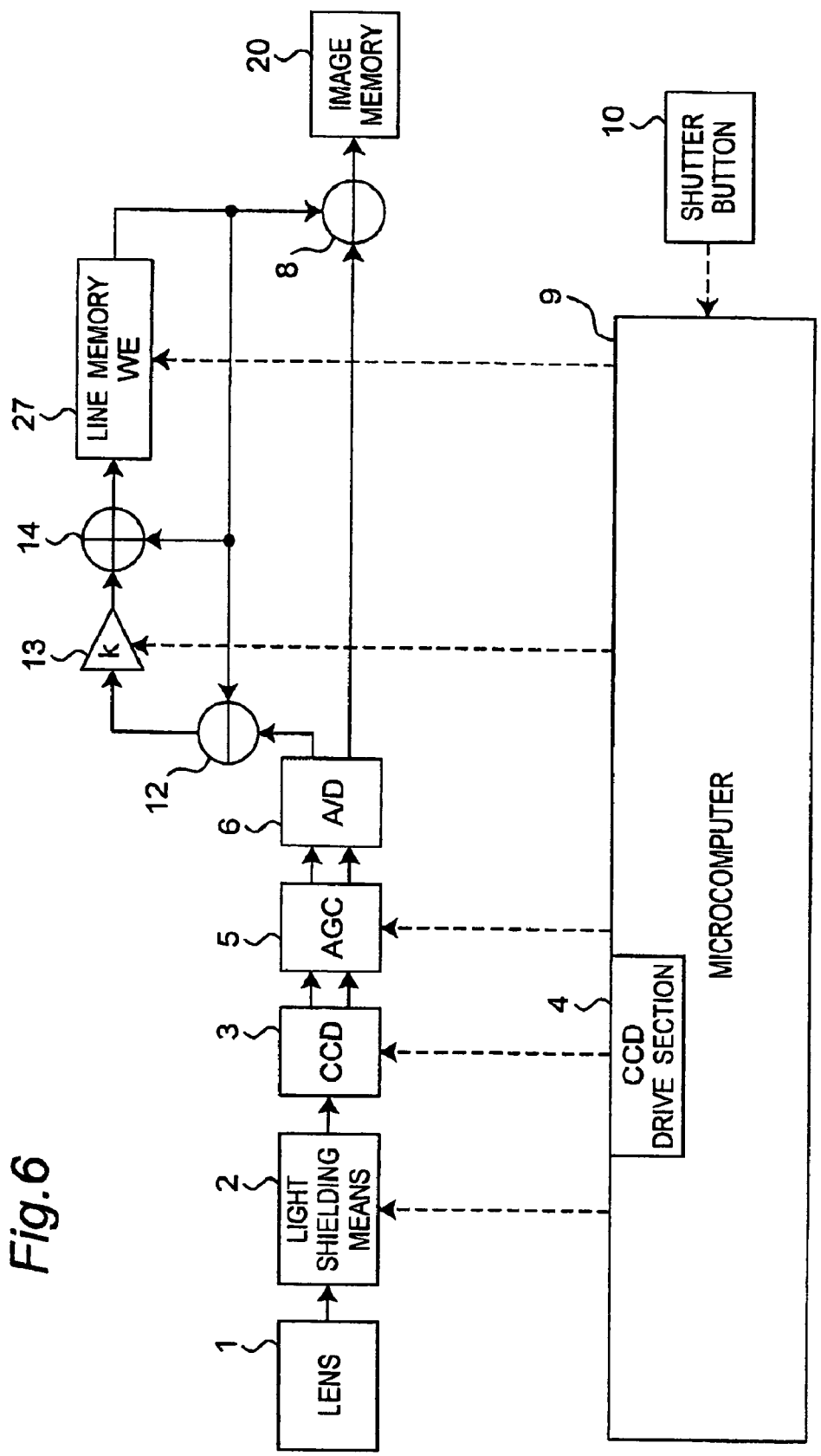
FIG. 6 is a block diagram of configuration of an imaging apparatus in the second embodiment of the invention.

FIG. 6 is a block diagram of configuration of imaging apparatus in this embodiment. What differs mainly from the configuration shown in FIG. 1 lies in the provision of a line memory 27 and IIR type low pass filter for providing the output of the line memory 27. This low pass filter includes a subtractor 12, a multiplier 13, an adder 14, and the line memory 27, and passes low frequency component of a dummy signal. The low pass filter has the transmission function shown below for averaging or weighted averaging of dummy signals of a plurality of lines output from the A/D converter 6 in the vertical direction.

$$(k \times z^{-1})/\{1-(1-k) \times z^{-1}\} \quad (1)$$

In formula (1), k is gain for the multiplier 13, fluctuating between 0 and 1, and the smaller the value, the greater is the low pass filter effect, and in weighted averaging, weighting on new signal output from the A/D converter 6 can be decreased. Also in formula (1), $z^{-1}$ means delay of one line.

The reason for providing such low pass filter is explained. Dummy signal contains not only transfer fixed noise component, but also random noise component. When a signal containing random noise component is used as a correction signal, random noise component is subtracted also from the image not generating random noise. As a result, in the image data after noise elimination, new noise of vertical stripes is generated due to subtraction of correction signal. Accordingly, to prevent random noise component from being contained in the correction signal, the low pass filter processing is done on the output from the CCD image sensor 3.

The reason for calculating weighted average of dummy signals is as follows. To eliminate effects of random noise on correction signal sufficiently, in formula (1), preferably, a sufficiently small value of k should be set, and dummy signals of multiple lines should be weighted and averaged. In the embodiment, therefore, by weighted average of dummy signals of a plurality of lines, one line of correction signal is generated.

2-3 Operation of Imaging Apparatus

Figure 7:
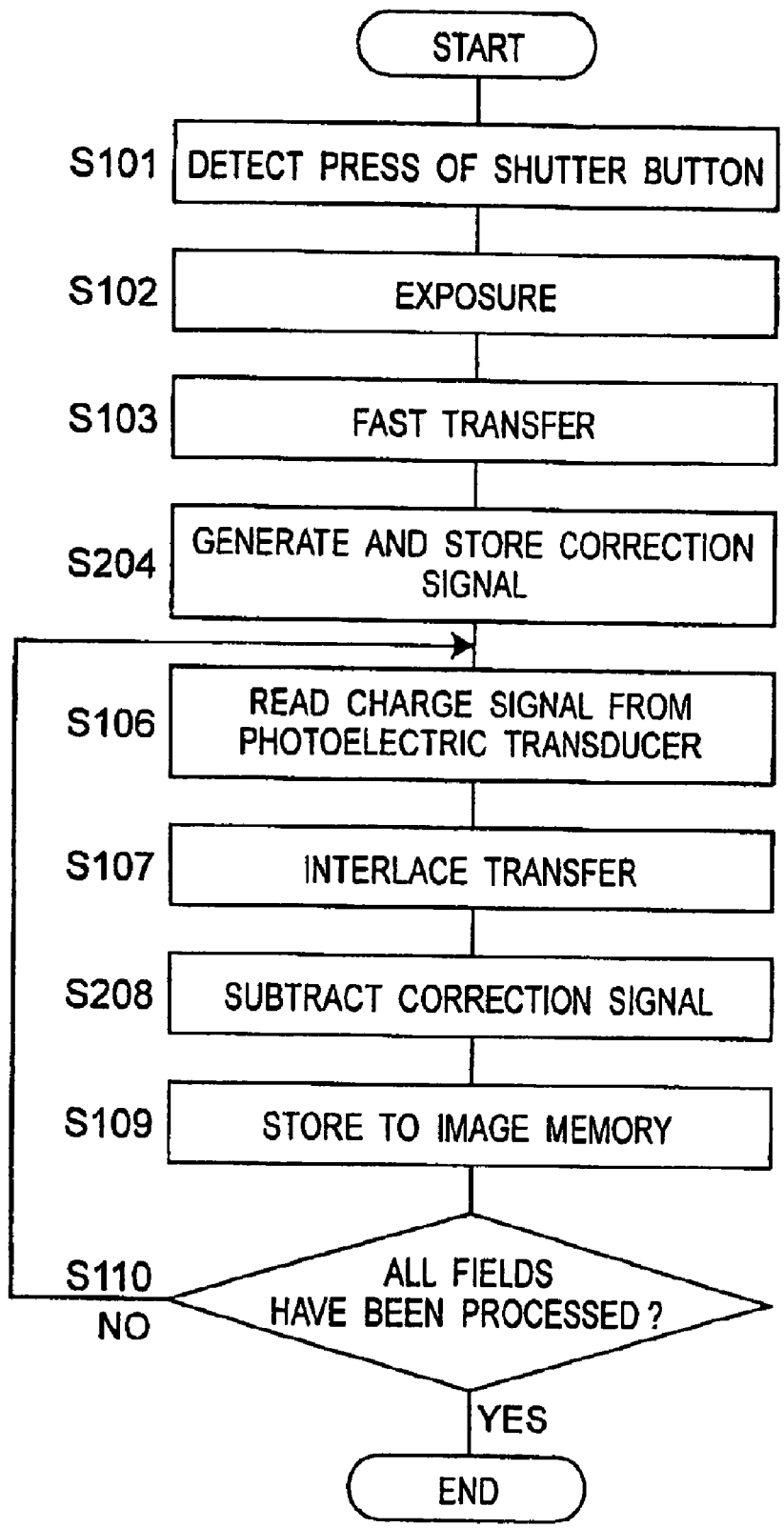
FIG. 7 is a flowchart of operation of the imaging apparatus in the second embodiment of the invention.
Figure 8:
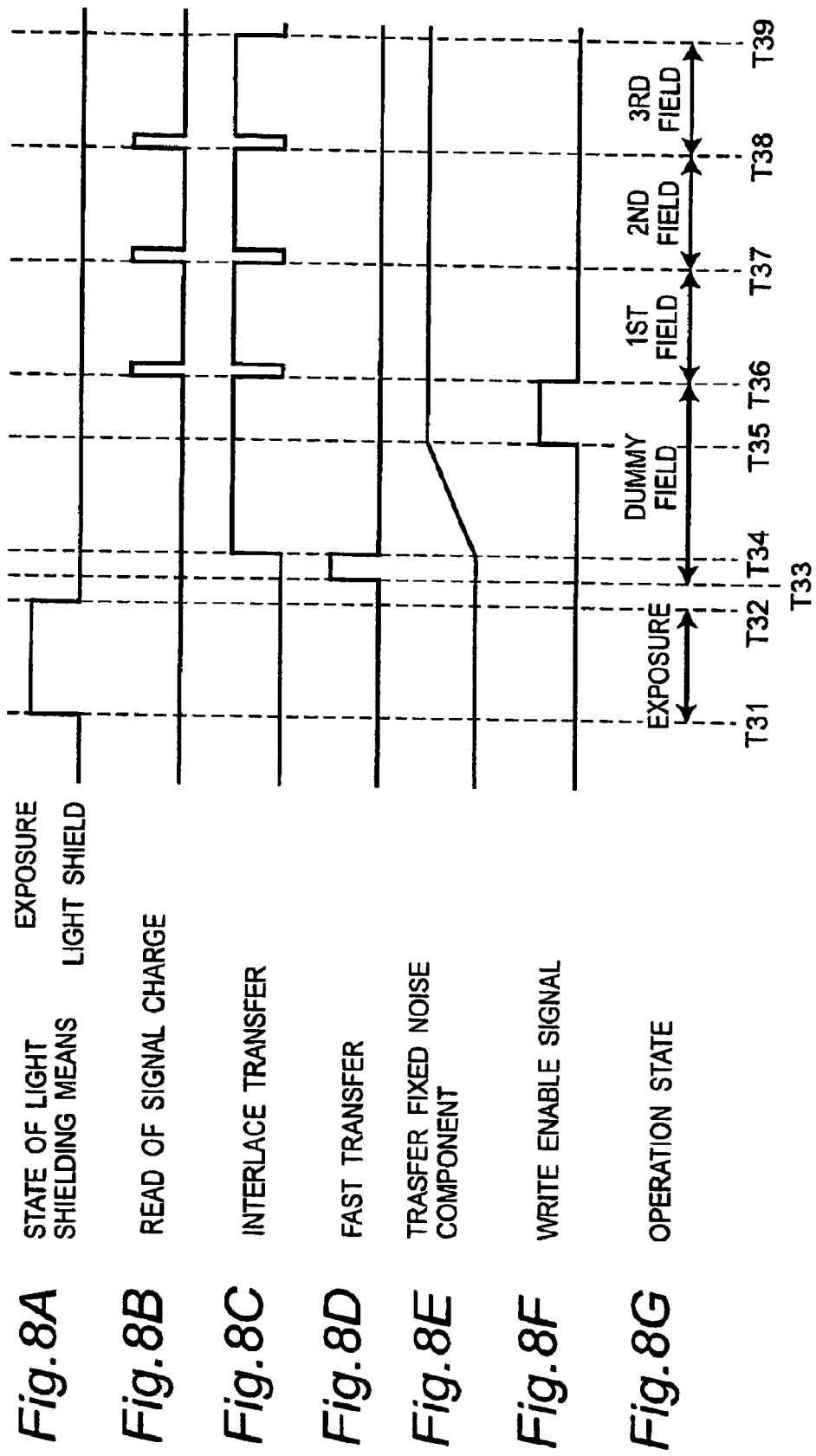
FIGS. 8A to 8G is timing charts of operation timing of the imaging apparatus in the second embodiment of the invention.
Figure 9:
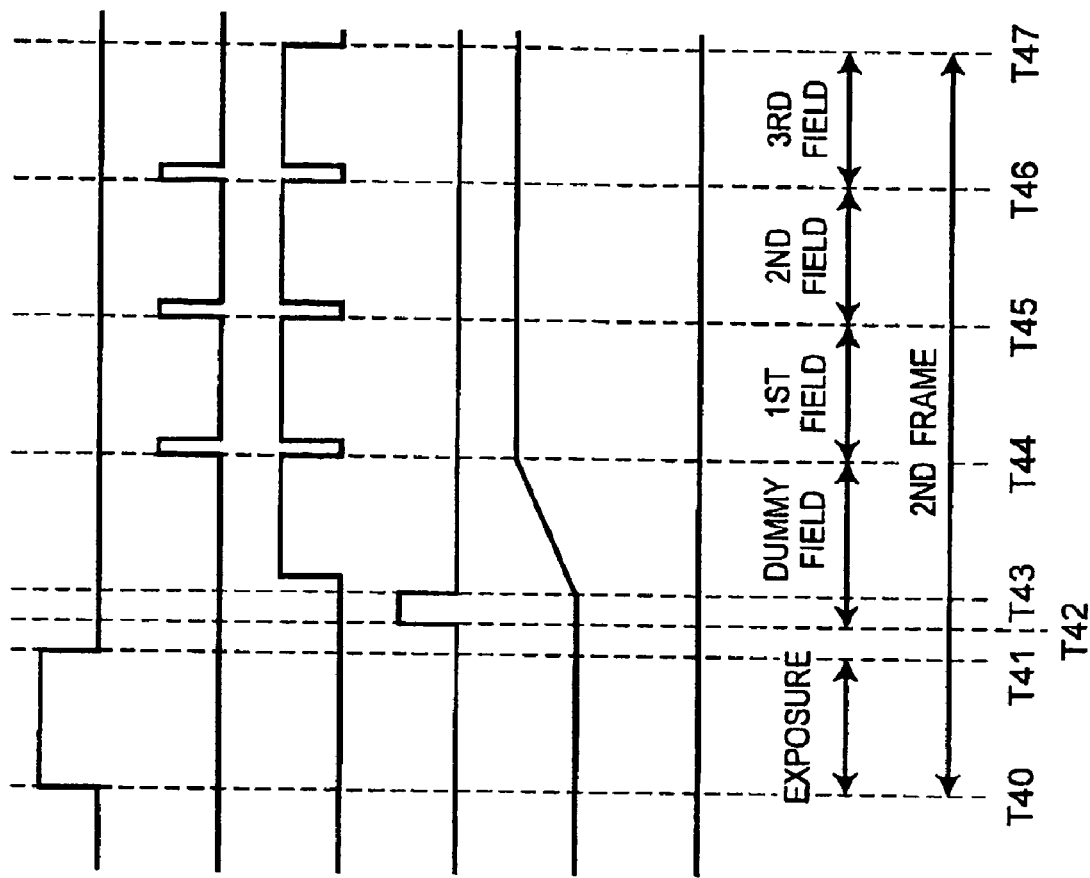
FIGS. 9A to 9G is timing charts of operation timing in continuous shooting mode of imaging apparatus in the second embodiment of the invention.

Operation of the imaging apparatus of the embodiment is explained by referring to FIGS. 7 and 8. FIG. 7 is a flowchart of operation of imaging apparatus in the second embodiment. What differs from the imaging apparatus in the first embodiment of the invention lies in generating method of a correction signal at a step S204, and subtracting method of a correction signal at a step S208. In the first embodiment, fast transfer is applied in all fields (S105 in FIG. 3), but in the second embodiment, fast transfer is applied in dummy fields only (S103), and not applied in the other fields.

FIGS. 8A to 8G are timing charts of operation timing of imaging apparatus in the second embodiment. FIGS. 8A to 8G correspond to FIGS. 4A to 4G.

In FIG. 7, operation of steps S101 to S103 is same as in the first embodiment, and its explanation is omitted. Going to a dummy field period by fast transfer (T33), when the fast transfer is over (T34), the vertical transfer resister 302 is driven by interlacing so as to output signal charge for one field without reading out the signal charge from the photoelectric transducer 301 to the vertical transfer register 302 (T34 to T35).

The dummy signal thus obtained contains transfer fixed noise component. Amount of transfer fixed noise component gradually increases as the time passes as shown in FIG. 8E, but the value becomes constant after completion of interlace transfer for one field, that is, after completion of ordinary vertical transfer for all stages of vertical transfer register 302 (T35). The reason is explained below. Before time T35, the number of times and transfer time of electric charge of pixel transferred by the vertical transfer register 302 differ depending on the position of the pixel, and thus the value of transfer fixed noise component increases along with the lapse of time. After time T35, however, regardless of the pixel position, the number of times of transfer and transfer time are constant, and hence the value of transfer fixed noise component is also constant. That is, it makes use of the phenomenon that when the time of interlace transfer is longer than a specific time, the transfer fixed noise component becomes constant.

When the transfer fixed noise component becomes constant, dummy signals of a specified number of lines are further transferred by interlacing, and data is read out from the CCD image sensor 3 (T35 to T36). In this period, by the low pass filter composed of the subtractor 12, multiplier 13, adder 14, and line memory 27, dummy signals of a plurality of lines being read out from the CCD image sensor 3 are deprived of random noise component, and weighted and averaged. The average value finally obtained is stored in the line memory 27 as a correction signal (S204, time T36). To realize such operation, the microcomputer 9 continues to output a write enable signal to the line memory 27 for the period of time T35 to T36.

When dummy field period is over, the CCD drive section 24 drives the CCD image sensor 3 so as to read out signal charge to the vertical transfer register 302 from the photoelectric transducer 301 without the fast transfer (S106, T36 in FIGS. 8A to 8G). Thus, the vertical transfer registers 302 are driven for the total number of transfer stages of the image at the same speed as when obtaining the correction signal, and then the vertical transfer registers 302 are driven at the same speed to obtain image data. That is, the time from previous sweeping of charge till present sweeping of charge is kept constant in all pixels throughout one image, so that transfer fixed noise component is kept constant. As a result, after obtaining the correction signal, image data should be obtained without the fast transfer mode of driving the vertical transfer register 302 at high speed.

The image data obtained by driving of the CCD image sensor 3 is put into the subtractor 8 (S107). In the subtractor 8, the correction signal being read out from the line memory 27 is subtracted from the input image data (S208). As the correction signal to be subtracted at this time, a common signal is used in each line. After elimination of noise, the image data is finally stored in the image memory 20 (S109). Same as in the first embodiment, this process is repeated in all fields, and a series of imaging operation is terminated (S110).

In this explanation, operation of the single shooting mode is described, but the concept of the embodiment is similarly applied in the continuous shooting mode, too. In this embodiment, however, different from the first embodiment, after imaging of second frame, the vertical transfer register 302 must be driven for the number of stages of all lines by interlace transfer before imaging of the first field this is intended to raise the transfer fixed noise component to a specific level. That is, a dummy field period must be provided before imaging the first field.

Operation in the continuous shooting mode is explained by referring to FIGS. 9A to 9G. FIGS. 9A to 9G are timing charts of operation timing in the continuous shooting mode of the imaging apparatus. FIGS. 9A to 9G correspond to FIGS. 8A to 8G. FIGS. 9A to 9G show only the operation timing when imaging the second frame out of imaging operation of a plurality of frames. Operation timing when imaging the first frame in the continuous shooting mode is same as operation timing of imaging in the single shooting mode, and its explanation is omitted.

In the continuous shooting mode, when imaging of the first frame is over, the microcomputer 9 controls the shielding means 2 to set in exposure state, and transfers to imaging operation of the second frame (T40). When exposure is over, the microcomputer 9 does not generate nor store the correction signal. However, not transferring to the first field period directly, a dummy field period is provided. The dummy field period is not intended to generate a correction signal, but is intended to keep constant the value of transfer fixed noise component. This point is different from the first embodiment.

When the vertical transfer registers 302 are driven for stages of all lines, different from the time of imaging the first frame, the dummy field period is finished immediately without provision of a period for reading out dummy signals of constant transfer fixed noise component for plural lines (period of T35 to T36 in FIGS. 8A to 8G), and it is transferred to first field period. Therefore, imaging after transfer to second frame is finished in shorter time than imaging time of first frame.

Operation in first to third field period (T44 to T47) is same as opera ion in first to third field period (T36 to T39, when imaging the first frame, and the explanation is omitted.

The low pass filter composed of the subtractor 12, multiplier 13, adder 14, and line memory 27 is an example of correction signal generating means of the invention. The correction signal generating means is designed to calculate average or weighted average of a plurality of dummy signals, but not limited to this example. The dummy signal may be directly used as correction signal without giving any processing, which is also included in the concept of correction signal. In this case, means for reading out the dummy signal from the CCD image sensor 3 and supplying to the line memory 27 corresponds to correction signal generating means. The line memory 27 is an example of storage means 7.

Third Embodiment 3-1 Outline of Imaging Apparatus

The imaging apparatus in the first or second embodiments is intended to correct regardless of temperature or gain of AGC 5. By contrast, the imaging apparatus in this embodiment determines whether or not to correct depending on the temperature and/or gain of AGC 5.

The value of transfer fixed noise component varies with temperature of the CCD image sensor 3, or magnitude of gain to the output of the CCD image sensor 3. At high temperature or large gain, the value of transfer fixed noise component is large. Herein, the large gain is a case of imaging at high sensitivity. In such a case, the transfer fixed noise component is large, and the necessity of correction for eliminating it is higher. On the other hand, when the temperature is low or the gain is small, the value of transfer fixed noise component is also small. In this case, correction may not be needed. If attempted to correct even in such case, noise may be newly generated or other side effects may occur due to extension of imaging time by provision of dummy field, or random noise component not completely eliminated in low pass filter processing. It is hence an object of the third embodiment of the invention to prevent such side effects.

3-2 Configuration of Imaging Apparatus

Figure 10:
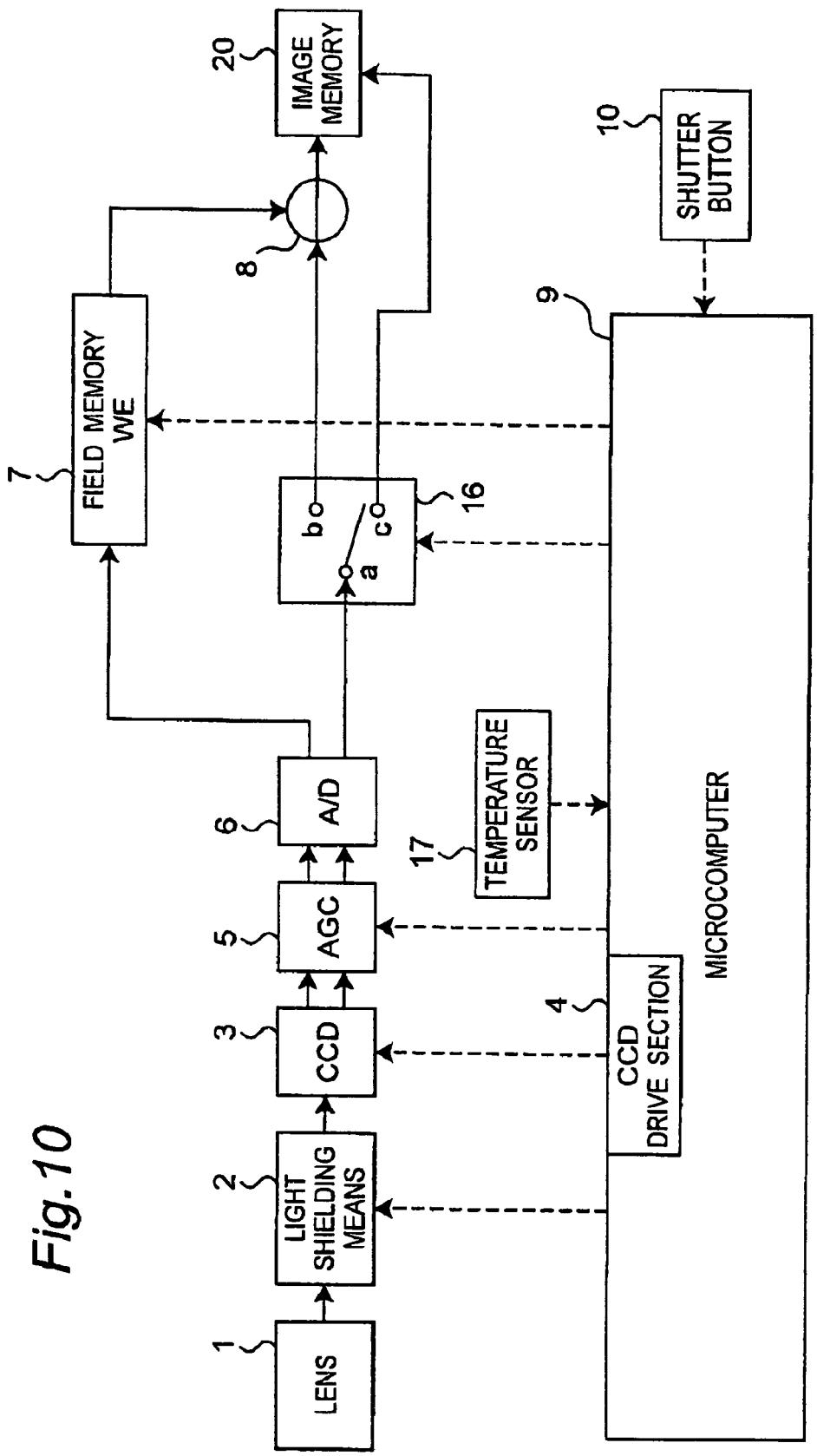
FIG. 10 is a block diagram of configuration of an imaging apparatus in the third embodiment of the invention.

FIG. 10 is a block diagram of configuration of the imaging apparatus in this embodiment. The imaging apparatus in this embodiment further includes a temperature sensor 17 and a switch 16 in addition to the configuration in FIG. 1.

The temperature sensor 17 is a sensor for detecting the temperature. The switch 16 has connection terminals a to c, and the connection terminal a is connected to the connection terminal b or connection terminal c by the control of the microcomputer 9. The connection terminal a is connected to the output of the A/D converter 6, the connection terminal b is connected to the subtractor 8, and the connection terminal c is connected to the image memory 20. When the connection terminal a is connected to the connection terminal b, image data obtained from the CCD image sensor 3 is corrected in the subtractor 8, and sent to the image memory 20. On the other hand, when the connection terminal a is connected to the connection terminal c, the image data is directly sent into the image memory 20 without correction in the subtractor 8.

The microcomputer 9 is monitoring the temperature detected by the temperature sensor 17 and the gain of AGC 5. While these values are large enough to satisfy formula (2) below, it controls the switch 16 to connect the connection terminal a to the connection terminal b to correct image data. When these values are small, not satisfying formula (2), it controls the switch 16 to connect the connection terminal a to the connection terminal c, thereby not correcting the image data.

$$G \times (T \times Tref)/4 > Th \qquad (2)$$

where G is the gain of AGC 5, T is the temperature detected by the temperature sensor 17, Tref is specified reference temperature, and Th a specified value. Formula (2) is determined in consideration of the property that a dark current becomes about twice along with temperature rise of 8 degrees.

3-3 Operation of Imaging Apparatus

Figure 11:
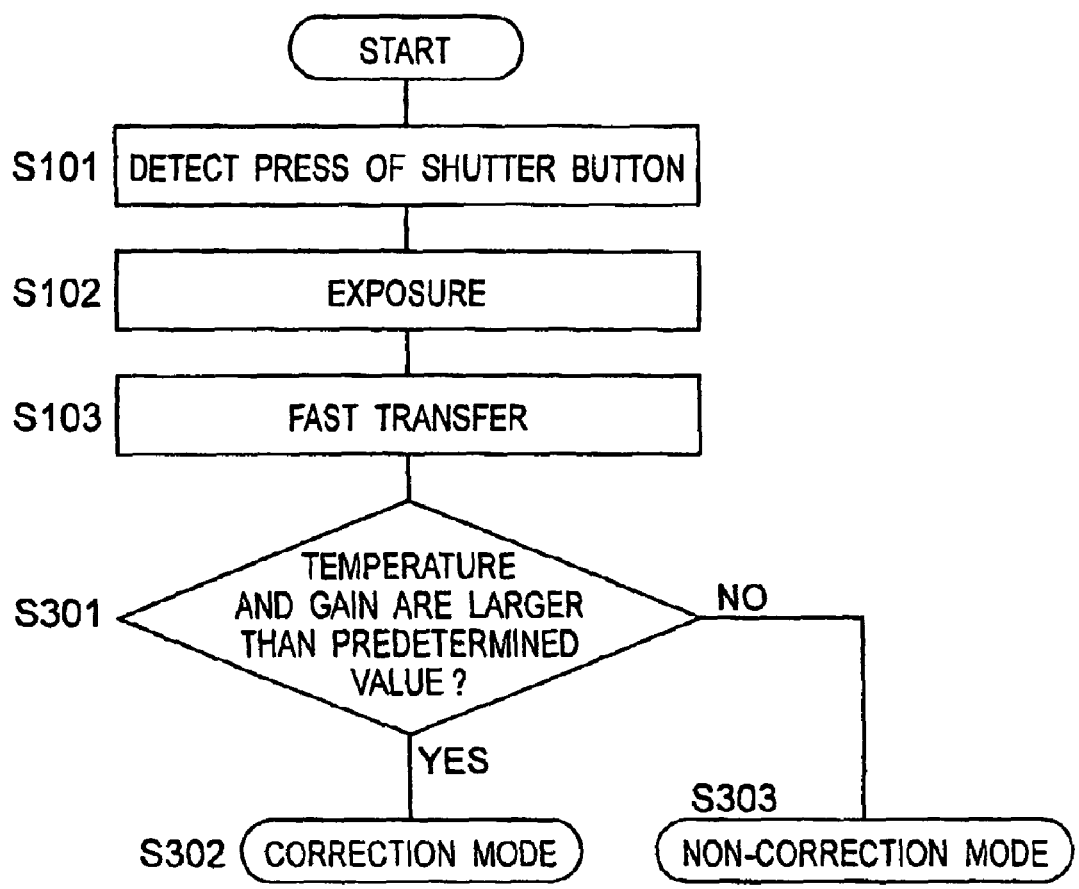
FIG. 11 is a flowchart of operation of the imaging apparatus in the third embodiment of the invention.
Figure 12:
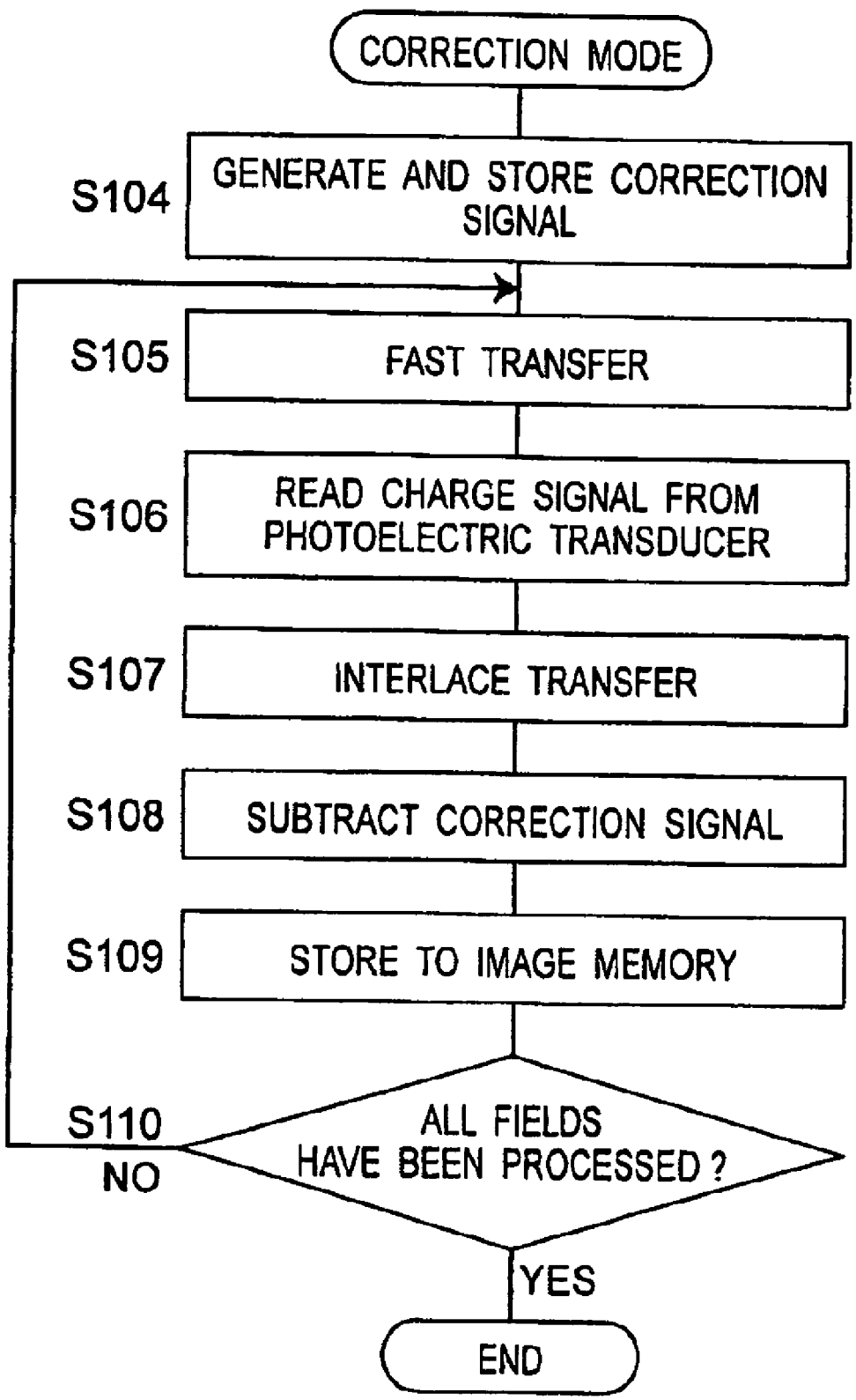
FIG. 12 is a flowchart of operation in correction mode of the imaging apparatus in the third embodiment of the invention.

FIG. 11 is a flowchart of operation of the imaging apparatus in this embodiment. FIG. 12 is a flowchart of operation when transferring to a correction mode in FIG. 11, and FIG. 13 is a flowchart of operation when transferring to non-correction mode in FIG. 11.

In FIG. 11, operation at steps S101 to S103 is same as operation at steps S101 to S103 in the first embodiment, and the explanation is omitted. At a step S301, the microcomputer 9 monitors the detected temperature by the temperature sensor 17 and gain of AGC 5, and judges if these values satisfy formula (2) or not. When these values satisfy formula (2), the process goes to the correction mode (S302), and when these values do not satisfy formula (2), the process goes to the non-correction node (3303).

When going to the correction mode, the operation as shown in the flow in FIG. 12 is done. That is, the operation is same as in the imaging apparatus in the first embodiment.

Figure 13:
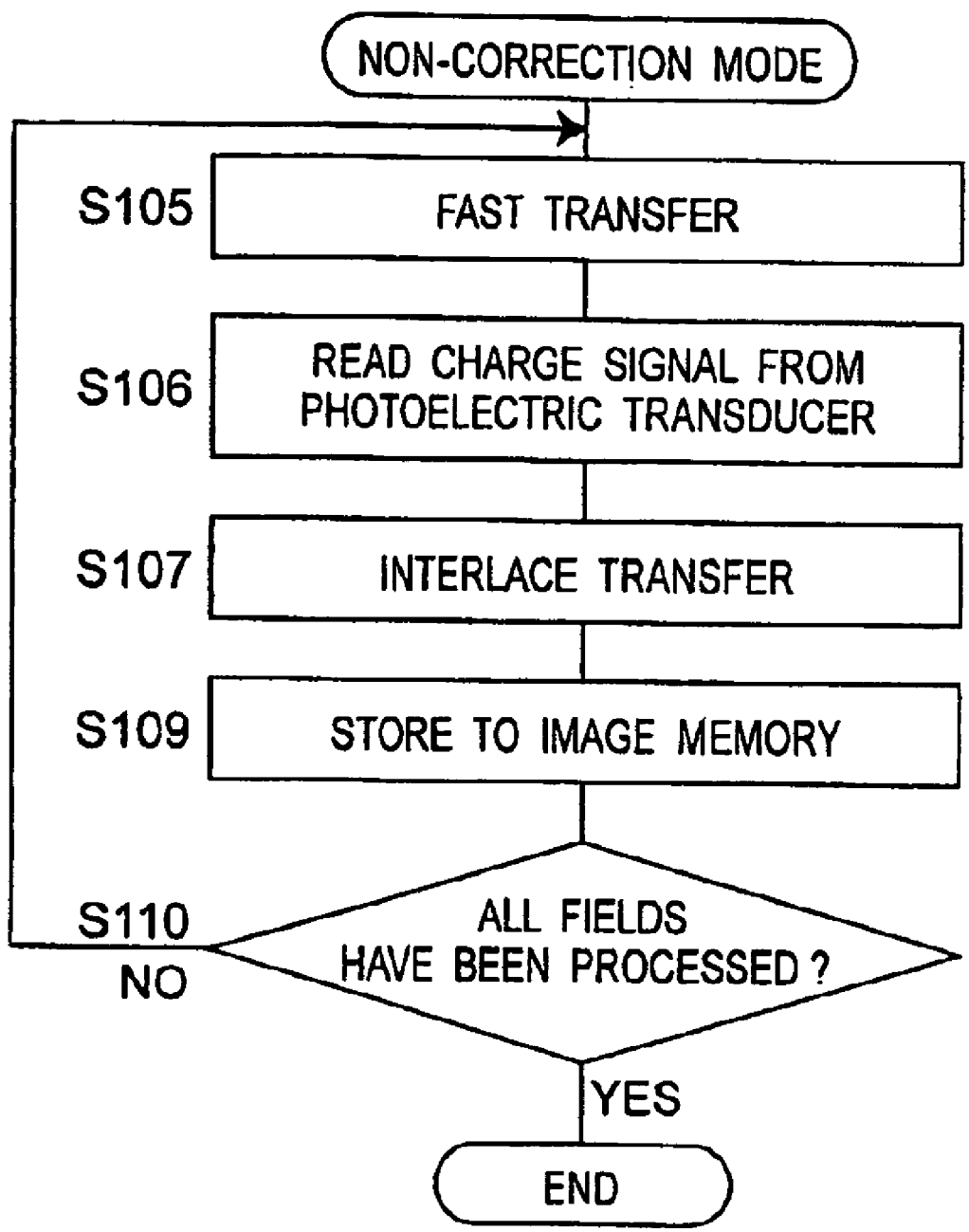
FIG. 13 is a flowchart of operation in non-correction mode of the imaging apparatus in the third embodiment of the invention.

On the other hand, when going to the non-correction mode, the operation is as shown in the flow in FIG. 13. That is, in the imaging apparatus of the first embodiment, this is the operation of not generating or storing correction signal and not correcting image data. In this case, since the dummy field period for generating correction signal is not needed, the imaging time is shorter than in the apparatus in the first embodiment. Since the image data is not corrected, noise is not newly generated due to random noise component which is not eliminated completely in the low pass filter process.

Fourth Embodiment

Several modified examples of first to third embodiments are explained.

i) In the second embodiment, as shown in formula (1), weighted averaging is processed by heavily weighing the dummy signals of pixels in lower part of the image. But averaging with equal weight may be processed on all signals. Thus, by weighing equally, the effect of suppressing random noise is greater, and the number of lines of dummy signals necessary for generating a correction signal may be curtailed.

ii) In the second embodiment, the microcomputer 9 controls the start of generation of the correction signal to be made after the transfer fixed noise component of the dummy signal becomes constant. But it may be also designed to make the start of generation of the correction signal before the transfer fixed noise component of the dummy signal becomes constant. AS a result, the converging speed of IIR filter can be accelerated. Hence, the necessary imaging time is further shortened.

iii) In the second embodiment, right after light-shielding, the fast transfer is started in order to sweep out smear charge (time T33 to T34 in FIG. 8D), but this fast transfer may be omitted. When the fast transfer is omitted, in the period of gradual increase of transfer noise (time T34 to T35 in FIG. 8F), smear charge can be swept out. In this case, since sweeping of smear charge and constant controlling of transfer fixed noise can be processed in parallel, the imaging time can be shortened accordingly.

iv) In the third embodiment, it is determined whether or not to correct depending on the temperature and gain, but it may be determined on the oasis of either temperature or gain.

v) In the third embodiment, a correction signal for one field is generated. But the invention intended to determine whether or not to correct depending on the temperature and/or gain may be also applied in the case of generating correction signal for one line as in the second embodiment of the invention.

vi) In the third embodiment, it is determined whether or not to correct depending on the temperature and/or gain, But depending on the temperature and/or gain, the magnitude of the correction signal for subtracting may be increased or decreased. In this case, as the temperature and/or gain magnitude increases, magnitude of the correction signal is increased for enhancing noise eliminating effect. However, upper and lower limits may be provided in the magnitude of the correction signal, and a region not increasing or decreasing the magnitude of the correction signal may be provided even if the temperature and/or gain magnitude changes. Correlation of temperature and/or gain magnitude and magnitude of correction signal may be expressed by linear function or other function. Further, hysteresis may be provided for increase or decrease of magnitude of the correction signal. Specifically, an amplifier is provided between the field memory 7 or line memory 27 and the subtractor 8, and the gain of this amplifier may be controlled by the microcomputer 9.

Outline of the Invention 2

In the first to fourth embodiments, the imaging apparatus for reducing fixed pattern noise of vertical stripes in a still picture is explained. In the following fifth to eleventh embodiments, the imaging apparatus for reducing fixed pattern noise of vertical stripes in a moving picture (moving image) is explained.

In the imaging apparatus explained below, the CCD image sensor 3 produces a moving picture by alternately repeating "image data output operation" for outputting image data by driving the vertical transfer register 302 while signal charge is read out from the photoelectric transducer 301 to the vertical transfer register 302, and "dummy signal output operation" for outputting a dummy signal by driving the vertical transfer register 302 while signal charge is not read out from the photoelectric transducer to the vertical transfer register 302. The imaging apparatus generates a correction signal on the basis of the dummy signal discharged by the dummy signal output operation, and subtracts the correction signal from the image data output by the image data output operation. The dummy signal output by the dummy signal output operation does not contain noise due to the photoelectric transducer 301, and hence the correction signal mainly composed of transfer noise component can be obtained. By subtracting this correction signal from the image data, transfer noise component is eliminated, and image data car be corrected.

Fifth Embodiment 5-1 Outline of Imaging Apparatus

Figure 14:
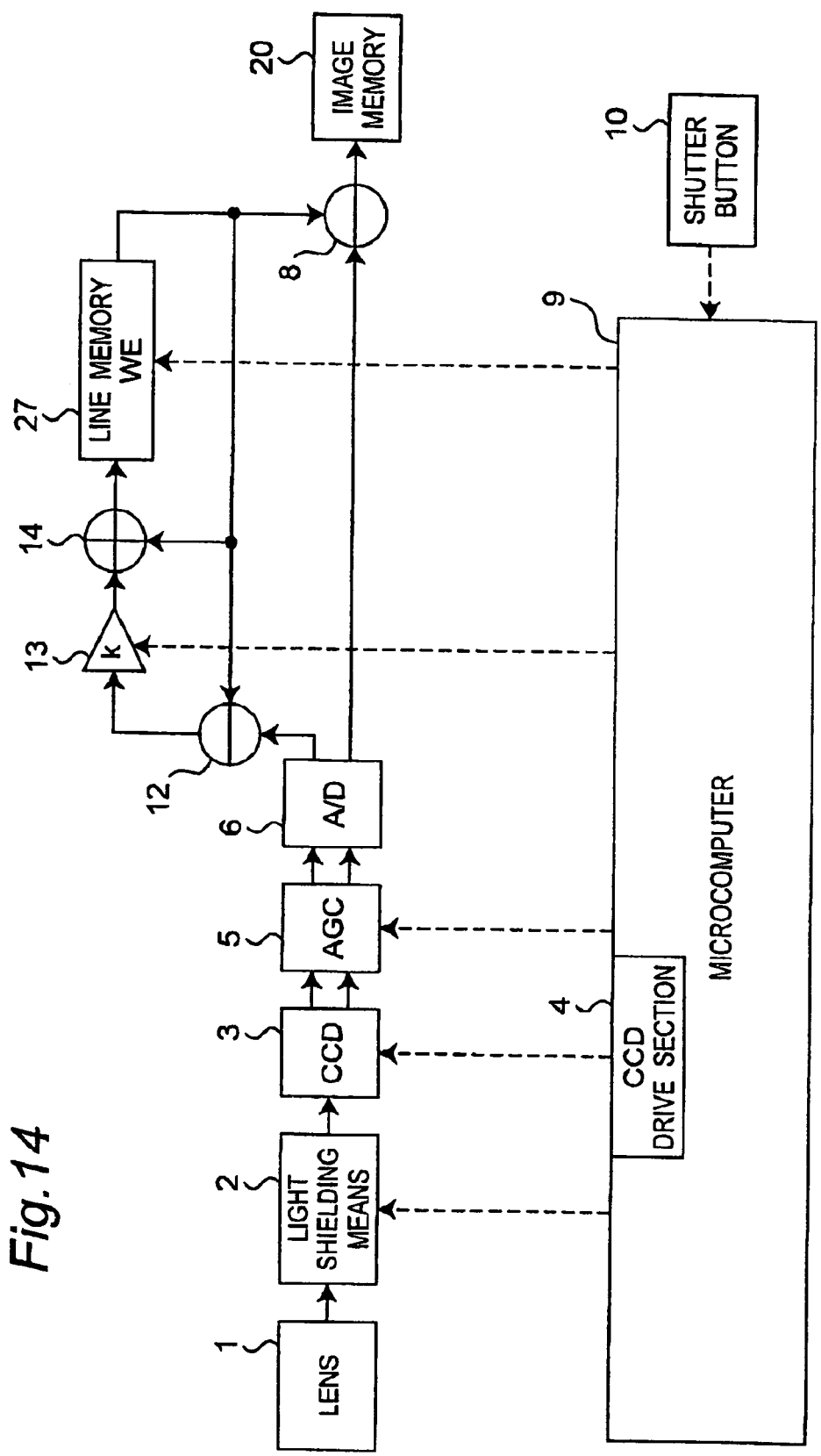
FIG. 14 is a block diagram of configuration of the imaging apparatus in the fifth embodiment of the invention.

FIG. 14 is a block diagram of configuration of the imaging apparatus in fifth embodiment of the invention. The imaging apparatus of the embodiment generates image data by converting an optical signal of image collected by a lens 1 into an electrical signal by the CCD image sensor 3. The optical signal collected by the lens 1 can be light-shielded by the shielding means 2. The shielding weans 2 is, for example, a mechanical shutter. The generated image data is adjusted in gain by the AGC 5, and is digitized in the A/D converter 6. The line memory 27 composes a low pass filter of IIR type together with the subtractor 12, multiplier 13, and adder 14, of which output is an output of the line memory 27. This low pass filter passes low frequency component of the dummy signal. The low pass filter calculates average or weighted average for dummy signals of a plurality of lines output form the A/D converter 6 in the vertical direction. The low pass filter has the transmission function shown in formula (1), and generates and outputs the correction signal.

The line memory 27 stores the correction signal. The line memory 27 nay update the correction signal by overwriting the previously stored correction signal by newly generated correction signal every time a correction signal is generated. Thus, correction signals can be generated frequently, and optimum correction signal can be obtained at the time.

The moving picture of the invention may be either recorded finally as image data in a memory card or the like, or may be temporarily stored in the image memory 20 and displayed as through-image in the display unit.

5-2 Operation of Imaging Apparatus

Figure 15:
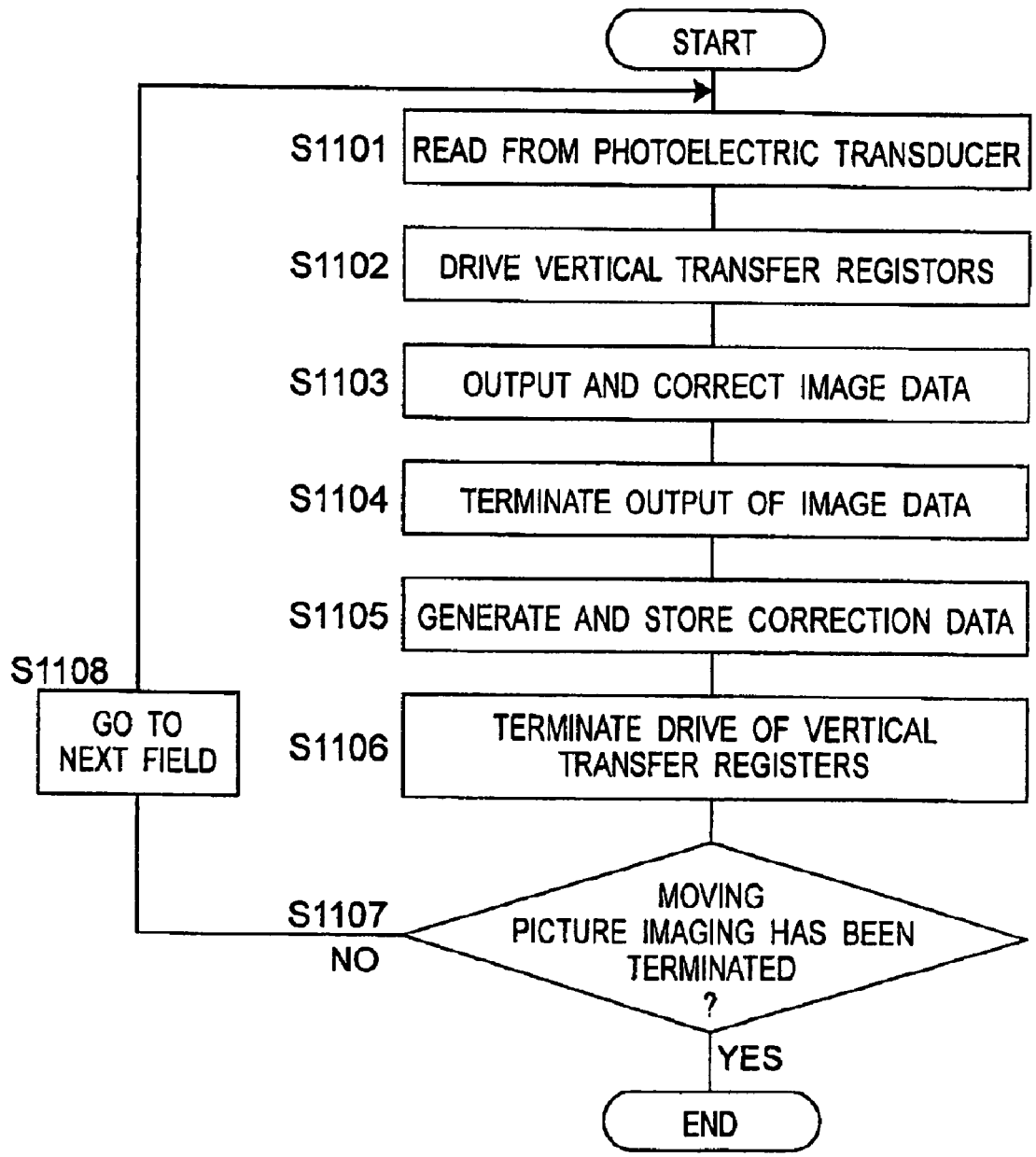
FIG. 15 is a flowchart of operation of an imaging apparatus in the fifth embodiment of the invention.

Operation of the imaging apparatus of the embodiment is explained by referring to FIGS. 15 and 16A to 16G. FIG. 15 is a flowchart of operation. FIGS. 16A to 16G are timing charts of operation timing in its operation. FIG. 16A is a diagram showing a state of the shielding means 2, in which high means exposure state, and low means light-shielded state. FIG. 16B is a timing diagram of reading out electric charge from the photoelectric transducer 301 into the vertical transfer register 302, in which high means reading. FIG. 16C is a timing chart showing driving state of the vertical transfer register 302, in which high is driving, and low is stopping of driving. FIG. 16D is a state diagram showing transfer state of signal charge being read out from the photoelectric transducer 301 into the vertical transfer register 302, in which high means transfer of such signal charge. FIG. 16E is a diagram of values of transfer fixed noise component of any row in one image, schematically shown by representing one image. FIG. 16F shows a write enable (WE) signal for the line memory 27, in which line memory 27 stores input signal when high. FIG.

16G is a diagram showing operation state of the imaging apparatus of the embodiment. Periods T1 to 4, T4 to T5, and T5 to T6 are respectively first to third field period of the same frame, these are periods for generating, correcting, and storing image data of first to third fields. The period T6 to T7 is a first field period of the next frame, and this is the period for generating, correcting, and storing image data of the first field of the next frame.

In this embodiment, the CCD image sensor 3 receives reading pulses which are periodically output, and reads oat signal charge from the photoelectric transducer 301 to the vertical transfer register 302 every time receiving the reading pulse, and performs the image data output operation (time T1 to T3) and the dummy signal output operation (time T3 to T4). The CCD image sensor 3 performs the image data output operation (time T1 to T3) and the dummy signal output operation (time T3 to T4) every time driving the vertical transfer register 302 by one field period.

Figure 16:
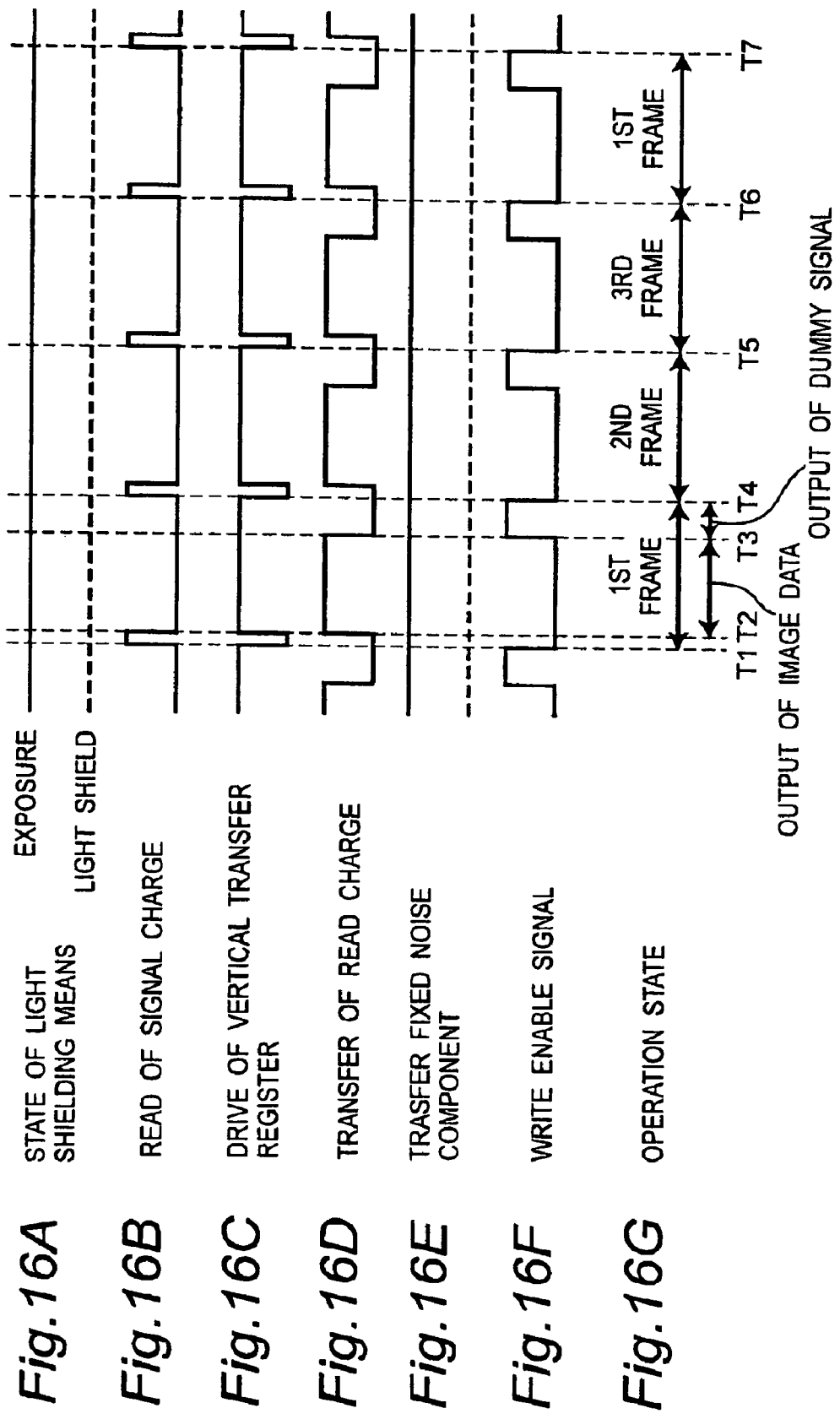
FIGS. 16A to 16G are timing charts of operation timing of the imaging apparatus in the fifth embodiment of the invention.

As shown in FIG. 16, the imaging apparatus of the embodiment is designed to repeat the same operations in every field, and the operations in the first field period (T1 to T4) are explained below representatively.

5-2-1 Output and Correction of Image Data

Output and correction of image data are explained first. What is explained here is the operations at steps S1101 to S1104 in FIG. 15, or in period T1 to T3 in FIG. 16.

In FIG. 15, when the power source of the imaging apparatus is turned on, moving picture imaging is started unless the shutter button 10 or other is pressed. In consequence, the CCD image sensor 3 receives a reading pulse generated outside or inside, and reads out signal charge from the photoelectric transducer 301 to the vertical transfer register 302 (S1101, time T1 in FIG. 16), as shown in FIG. 16B. Herein, the reading pulse is a timing signal for giving a control toning of the CCD image sensor 3, and is a trigger signal for reading out signal charge from the photoelectric transducer 301 to the vertical transfer register 302. In this embodiment, the reading pulse is output periodically, but the frequency of this period may be changed by operation of the CCD image sensor 3. The CCD image sensor 3, every time receiving the reading pulse, reads out signal charge from the photoelectric transducer 301 to the vertical transfer register 302, and performs the image data output operation (time T1 to T3).

Further, as shown in FIG. 16A, in this embodiment, during the moving picture imaging period, the shielding means 2 is always in exposure state, but not limited to this example, a certain period of moving picture imaging period may be changed from exposure state to light-shielded state.

The signal charge being read out to the vertical transfer register 302 is transferred by interlacing between the vertical transfer registers 302 (S1102), and is output from the CCD image sensor 3 to the AGC 5 by way of the horizontal transfer register 303. This output signal charge is digitized in the A/D converter 6 as image data. Later, the subtractor 8 subtracts the correction signal stored in the line memory 27 from this digitized image data (S1103). Finally, image data free from noise is stored in the image memory 20.

By such subtracting process, transfer noise component can be eliminated from the image data obtained from the CCD image sensor 3. More specifically, image data before noise elimination in each field contains noise derived from electric charge generated in the vertical transfer register 302. Noise derived from electric charge generated in the vertical transfer register 302 is same as the dummy signal mentioned above. Accordingly, by subtracting the correction signal being read out from the mine memory 27 from the image data of each field by the subtractor 8, transfer noise component can be eliminated.

When such operation is completely done in all image data of one field, output of image data is finished (S104, time T3 in FIG. 16).

5-2-2 Generation and Storage of Correction Signal

Generation and storage of a correction signal are explained. What is explained here is the operations at steps S1105 to S1108 in FIG. 15, and in period T3 to T4 in FIG. 16.

As shown in FIGS. 16C and 16D, even after finishing image data output (S1104), the CCD image sensor 3 continues to drive the vertical register 302. By this driving, the electric charge output from the CCD sensor 3 in this period (time T3 to T4) does not contain electric charge generated in the photoelectric transducer 301, and contains only the electric charge generated in the vertical transfer register 302. The signal composed of such electric charge is called "a dummy signal", and its output operation is called "dummy signal output operation". From this dummy signal, the correction signal is generated.

In the period of time T3 to T4, weighted average is calculated while eliminating random noise component from the dummy signal which is being read out from the CCD image sensor 3 and the dummy signal which has been read out in the previous field, by the low pass filter composed of the subtractor 12, multiplier 13, adder 14, and line memory 27. That is, the low pass filter calculates the weighted average of a plurality of dummy signals output when receiving reading pulses mutually different. At this time, the dummy signal read out in the same field may be obtained either for one line or a plurality of lines.

The finally obtained average is stored in the line memory 27 as a correction signal (S1105, time T4 in FIGS. 16A to 16G). To perform such operation, the microcomputer 9 sends a write enable signal to the line memory 27 in the period of time T3 to T4 as shown in FIG. 16F.

Afterwards, finishing the driving of the vertical transfer register 302 (S106), when the user instructs end of moving picture imaging, a series of operation is finished, or if not instructed, the process goes to imaging operation of the next field (S1107, S1108).

By generating, correcting and storing the image data of first to third fields according to the operations explained above, one frame of image data in the moving picture is generated. By continuing these operations during moving picture imaging to couple the frames, image data that can be reproduced as moving picture can be recorded.

Main factor of the transfer fixed noise component shown in FIG. 16E is electric charge generated by a dark current on the vertical transfer register 302, as mentioned above. The amount of this electric charge increases in proportion to the duration of the electric charge staying on each vertical transfer register 302. In this embodiment, when imaging a moving picture, since data is read out at constant interval in all fields, the transfer fixed noise component does not change in the course of time during moving picture imaging.

Since the dummy signal does not contain electric charge generated in the photoelectric transducer 301, when the image data is corrected by using the correction signal generated room the dummy signal, noise derived from the photoelectric transducer 301 is not corrected. Hence, if noise derived from the photoelectric transducer 301 is small and noise derived from the vertical transfer register 302 is large, noise to be corrected can be eliminated effectively, and image data of high quality can be obtained.

Moreover, since the correction signal can be generated by reading out dummy signals for one or several lines, as compared with the prior art of generating the correction signal by reading out one whole frame, the time for generating the correction signal can be shortened. As a result, the shutter time lag or imaging interval can be shortened. Since the generating time of correction signal is short, frame skipping in the moving picture imaging can be prevented. Thus, the image data of each field is corrected by using the correction signal generated from dummy signals of shorter than one field because the image data in each field is nearly the same in the transfer fixed noise component.

Since it is enough to store data for one line as a correction signal, the storage mans for storing the correction signal may be small in storage capacity. Specifically, the capacity of the storage means may be equal to or somewhat larger than the capacity corresponding to image data of one line, and may be smaller than the capacity corresponding to image data of two lines.

As a conventional method of curtailing the storage capacity of storage means for storing the correction signal, the other method has been proposed to store, as a correction signal, signals of one row in signals obtained by reading out and transferring the signal charge to the vertical transfer register in light-shielded state. But in this method, however, since the same correction signal is subtracted in each pixel of one line, it cannot be overcome the fixed pattern noise of vertical stripes.

5-3 Summary

According to the imaging apparatus of the embodiment, moving picture is output from the CCD image sensor 3 by alternately repeating "image data output operation" of outputting image data by driving the vertical transfer register 302 while the signal charge is read out from the photoelectric transducer 301 to the vertical transfer register 302, and "dummy signal output operation" of outputting dummy signal by driving the vertical transfer register 302 while signal charge is not read out from the photoelectric transducer 301 to the vertical transfer register 302. The correction signal is subtracted from the image data output by the image data output operation. As a result, noise newly generated on correcting the image data due to random noise contained in the correction signal can be reduced.

Sixth Embodiment

In fifth embodiment, the line memory 27 is updated by the newly generated correction signal regardless of change in correction signal. Accordingly, if smear is generated after imaging a subject of high luminance, and this smear is mixed in the dummy signal, a correction signal is generated by using this dummy signal, and it is used for correction. As a result, when correcting the image data, even in the image data actually not containing noise, only the smear portion is corrected, and new noise may be generated in the image data.

In this embodiment, in order to prevent smear from mixing into the correction signal, it has change amount detecting means for detecting the change amount between the level of dummy signal previously output from the CCD image sensor 3 and the level of the dummy signal newly output. The line memory 27 is designed not to update the correction signal if the change amount detected by the change amount detecting means exceeds a predetermined value.

Figure 17:
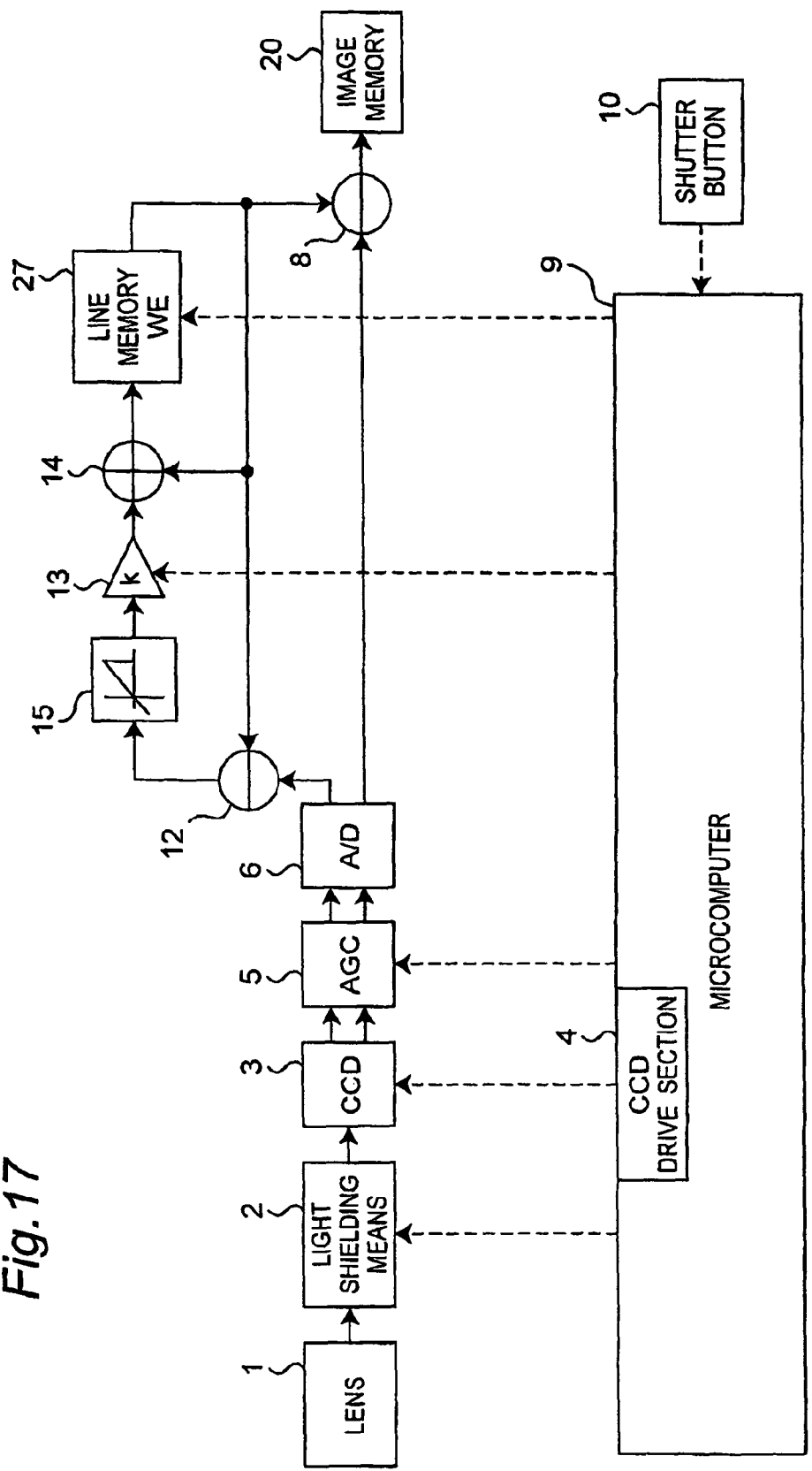
FIG. 17 is a block diagram of configuration of an imaging apparatus in the sixth embodiment of the invention.

FIG. 17 is a block diagram of configuration of the imaging apparatus in this embodiment. The imaging apparatus of the embodiment is similar to the imaging apparatus of fifth embodiment, except that a clip circuit 15 is added. This clip circuit 15 composes the charge amount detecting means together with the subtractor 12, multiplier 13, adder 14, and line memory 27. However, the configuration of the change amount detecting means is not particularly specified.

In FIG. 17, the dummy signal output from the CCD image sensor 3 is sent into the clip circuit 15 by way of the AGC 5, A/D converter 6, and subtractor 12.

The clip circuit 15 receives the output signal from the subtractor 12. If the input value is not over a predetermined value, the clip circuit 15 outputs the input value directly, or if exceeding the predetermined value, it outputs 0. The line memory 27 updates the stored correction signal to a new correction value output from the adder 14 if any value is output from the clip circuit 15, and does not update if 0 is output.

The output of the subtractor 12 shows the change amount of the dummy signal. If there is smear of large level, a value exceeding the predetermined value is output from the subtractor 12, and the output value of the clip circuit 15 is 0, and the correction signal in the line memory 27 is not updated, hence effects of smear on correction signal can be prevented. It is hence effective to prevent new noise from occurring in the image data if smear mixes into the dummy signal.

In the embodiment, the change amount detecting means is designed to determine the change amount in the average or weighted average of hitherto determined dummy signals, that is, between the correction signal and the present dummy signal, but the change amount between the previous dummy signal and the present dummy signal may be determined. In the invention, the change amount between the level of dummy signal previously output from the imaging means and the level of presently output dummy signal is the concept including the two change amounts stated above. Further, the change amount used in the invention is the concept including the change amount between the previous dummy signal and the present dummy signal, and is also the concept including the change amount between the hitherto obtained correction signals and the present dummy signal.

Seventh Embodiment

Figure 18:
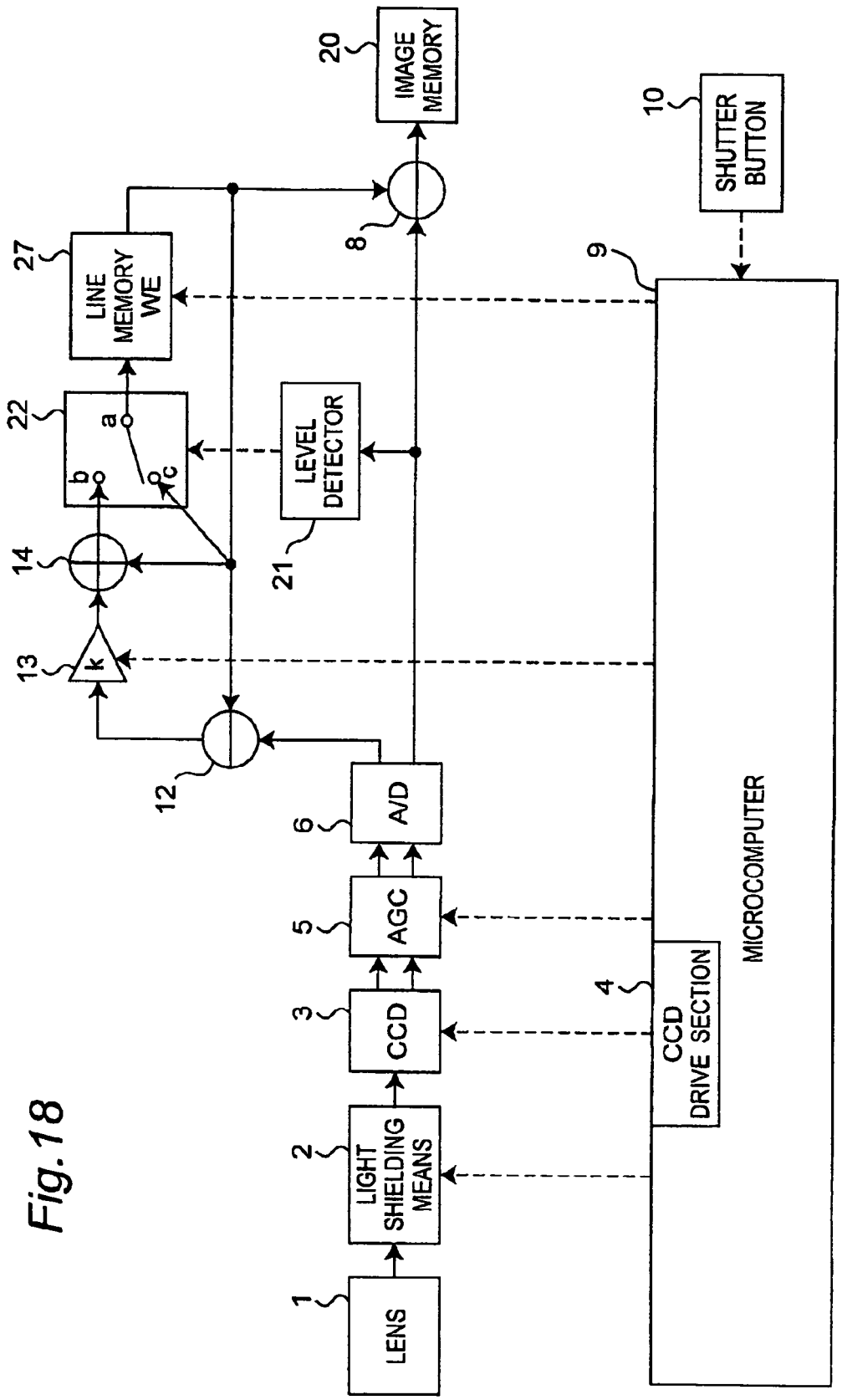
FIG. 18 is a block diagram of configuration of the imaging apparatus in the seventh embodiment of the invention.

This embodiment, same as the sixth embodiment, is intended to prevent smear from mixing into a correction signal. FIG. 18 is a block diagram of configuration of the imaging apparatus in this the sixth embodiment.

The imaging apparatus of the embodiment, in addition to the configuration of the imaging apparatus in the fifth embodiment, further includes a level detector 21 for detecting the level of the dummy signal output from the CCD image sensor 3, and a switch 22 for changing over the input signal to the line memory 27. The line memory 27 does not update the correction signal if the level detected by the level detector 21 exceeds a predetermined value.

The level detector 21 receives a dummy signal, and compares the dummy signal with a specified threshold, and controls the switch 22 according to the result of comparison. When the dummy signal is smaller than the threshold, it controls the switch 22 to connect the connection terminal a to the connection terminal b. As a result, the output of the adder 14 is put into the line memory 27, and a new correction signal is entered. The line memory 27 stores this signal, and it means that the line memory 27 updates the correction signal.

On the other hand, when the dummy signal is larger than the threshold, it controls the switch 22 to connect the connection terminal a to the connection terminal c. As a result, the output of the line memory 27 is entered into the line memory 27, and hence the previous correction value is entered. The line memory 27 stores the entered correction signal, and it weans that the line memory 27 does not update the correction signal.

Thus, if smear is generated in the dummy signal and the level of the dummy signal exceeds a predetermined value, the correction signal of the line memory 27 is not updated, and hence adverse effects of the smear on correction signal can be prevented. It is hence effective to prevent new noise from occurring in the image data if smear mixes into the dummy signal.

Eighth Embodiment 8-1 Outline of Imaging Apparatus

In the imaging apparatus in fifth to seventh embodiments, the correction is processed regardless of the temperature or the gain of AGC 5. By contrast, in the imaging apparatus of this embodiment, necessity of the correction process is determined in consideration of the temperature or the gain of AGC 5.

The value of transfer fixed noise component varies with the temperature of the CCD image sensor 3, or magnitude of the gain to the output of the CCD image sensor 3. At high temperature or large gain, the value of transfer fixed noise component is large. Herein, the large gain is provided in imaging at high sensitivity. In such a case, the transfer fixed noise component is large, and the necessity of the correction for eliminating it becomes higher. On the other hand, when the temperature is low or the gain is small, the value of transfer fixed noise component is small. In this case, the correction may not be needed. If attempted to apply the correction even in such a case, noise may be newly generated or other side effects may occur due to extension of imaging time for determining the correction signal, or random noise component not completely eliminated in the low pass filter processing. It is hence an object of this embodiment to present an imaging apparatus capable of preventing such side effects.

8-2 Configuration of Imaging Apparatus

Figure 19:
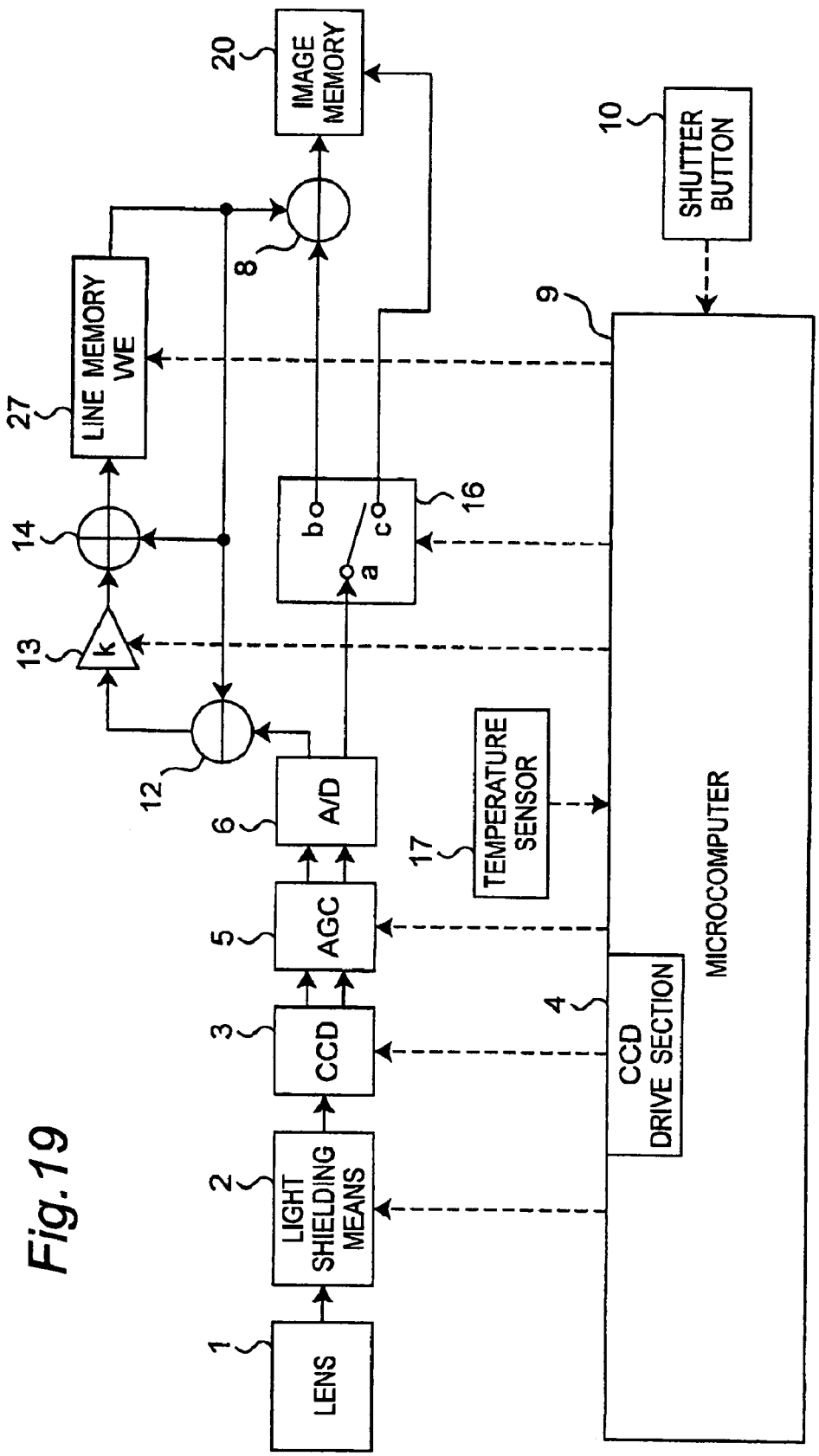
FIG. 19 is a block diagram of configuration of an imaging apparatus in the eighth embodiment of the invention.

FIG. 19 is a block diagram of configuration of the imaging apparatus in this embodiment. The imaging apparatus in this embodiment further includes, in addition to the configuration of the imaging apparatus of fifth embodiment, a temperature sensor 17 and a switch 16.

The temperature sensor 17 is a sensor for detecting the temperature. The switch 16 has connection terminals a to c, and is controlled by the microcomputer 9 to connect the connection terminal a to the connection terminal b or connection terminal c. The connection terminal a is connected to the output of the A/D converter 6, the connection terminal b is connected to the subtractor 8, and the connection terminal c is connected to the image memory 20. When the connection terminal a is connected to the connection terminal b, image data obtained from the CCD image sensor 3 is corrected in the subtractor 8, and sent to the image memory 20. On the other hand, when the connection terminal a is connected to the connection terminal c, the image data is directly sent into the image memory 20 without being corrected in the subtractor 8.

The microcomputer 9 is monitoring the temperature detected by the temperature sensor 17 and the gain of AGC 5. While these values are large enough to satisfy formula (3) below, it controls the connection so as to connect the connection terminal a to the connection terminal b, thereby correcting the image data. When these values are small, not satisfying formula (3), it controls the connection to connect the connection terminal a to the connection terminal c, thereby not correcting the image data.

$$G*(T-Tref)/4 > Th \quad (3)$$

where G is the gain of AGC 5, T is the temperature detected by the temperature sensor 17, Tref is specified reference temperature, and Th is a predetermined value. Formula (3) is determined in consideration of the property that the value of dark current becomes about twice along with temperature rise of 8 degrees.

8-3 Operation of Imaging Apparatus

Figure 20:
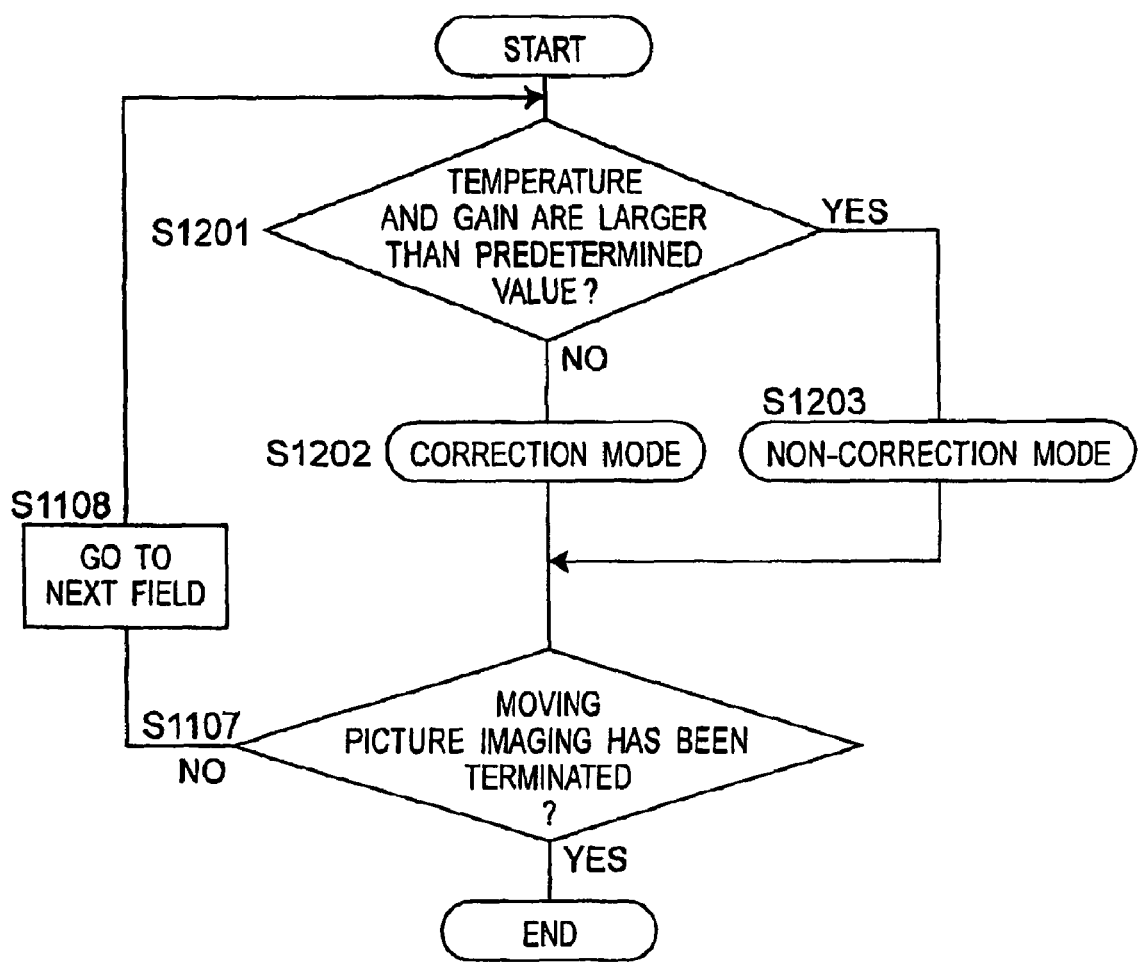
FIG. 20 is a flowchart of operation of the imaging apparatus in the eighth embodiment of the invention.
Figure 21:
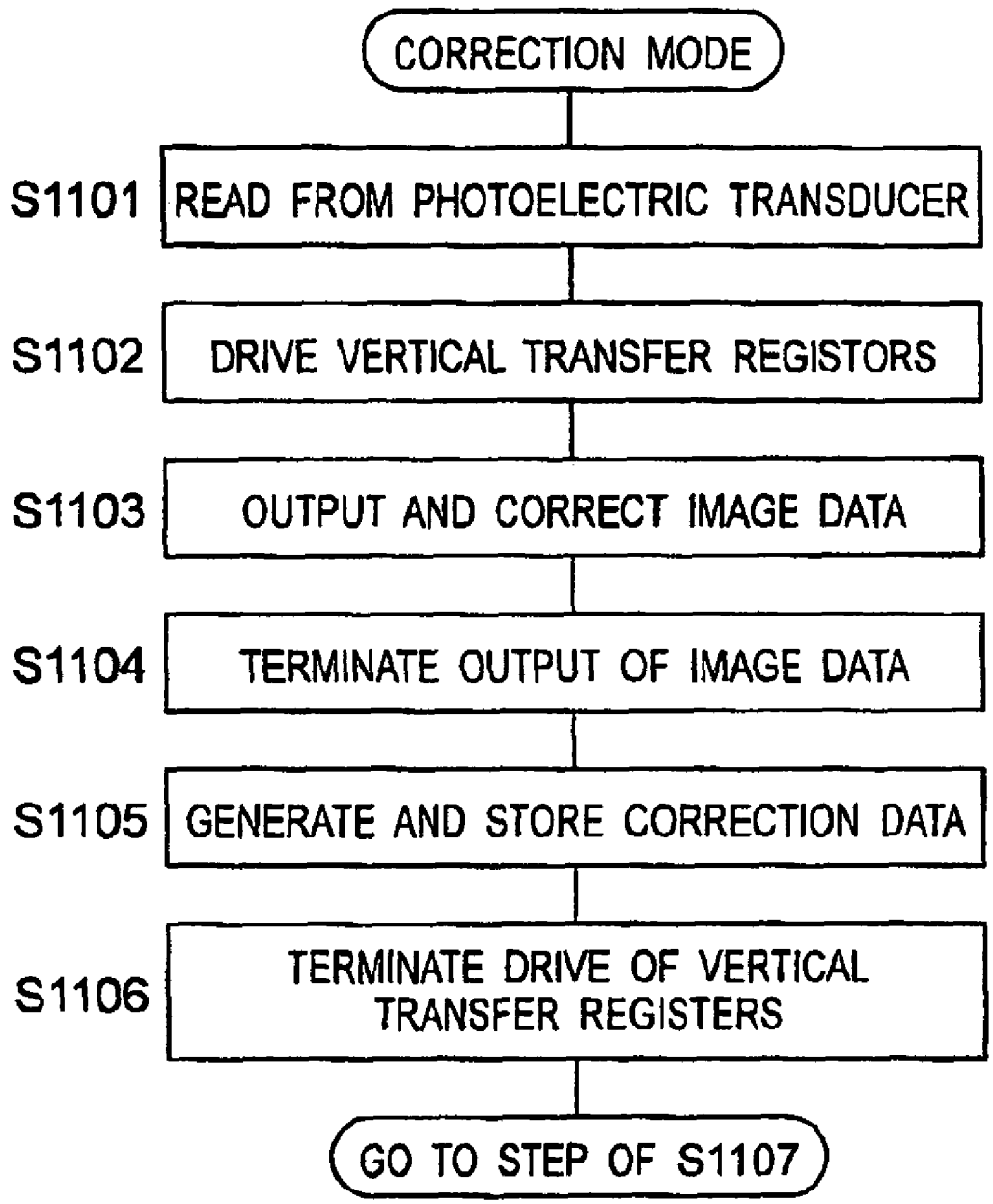
FIG. 21 is a flowchart of operation in correction mode of the imaging apparatus in the eighth embodiment of the invention.
Figure 22:
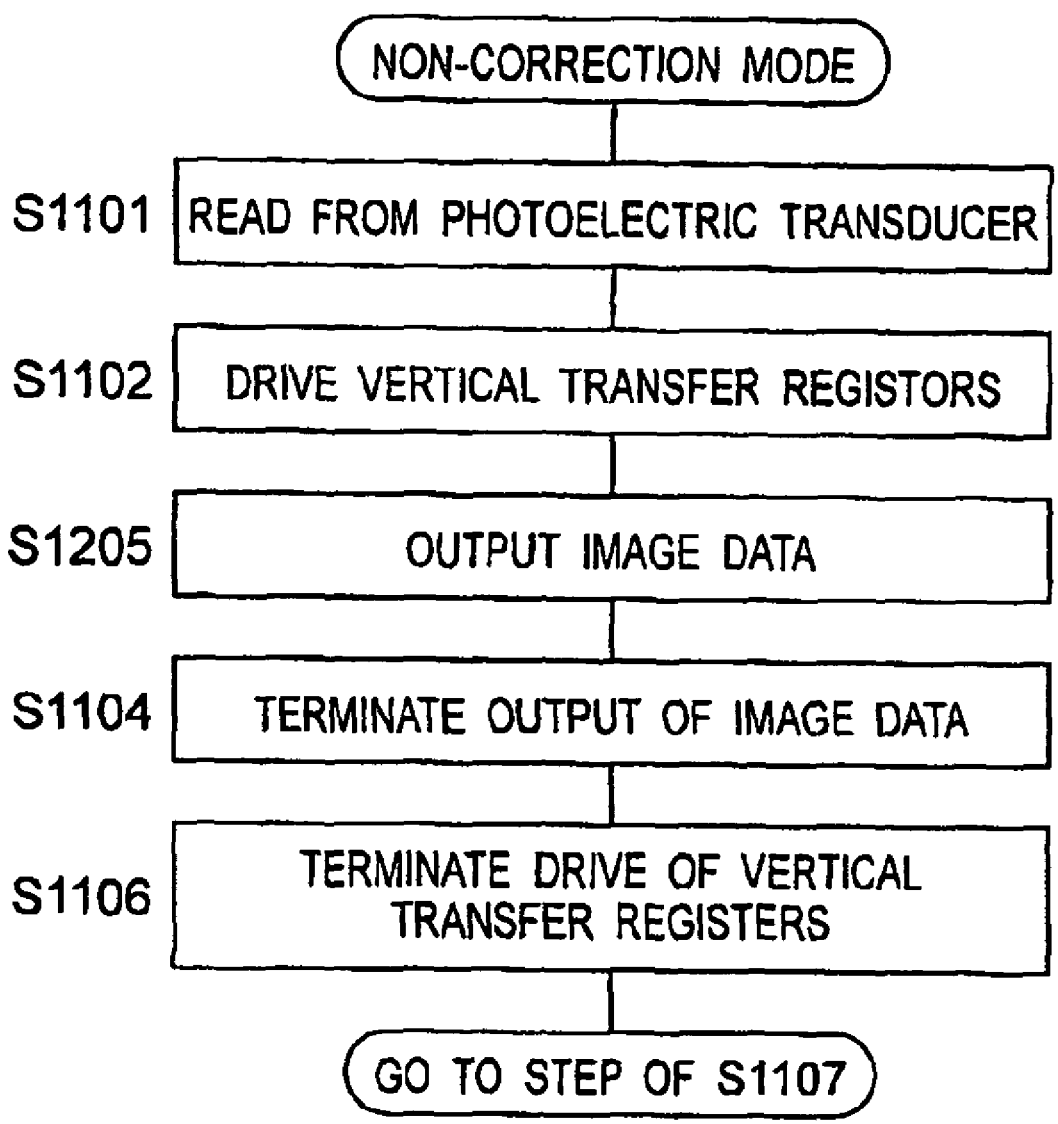
FIG. 22 is a flowchart of operation in non-correction mode of the imaging apparatus in the eighth embodiment of the invention.

FIG. 20 is a flowchart of operation of the imaging apparatus in this embodiment. FIG. 21 is a flowchart of operation when transferring to a correction mode in FIG. 20. FIG. 22 is a flowchart of operation when transferring to a non-correction mode in FIG. 20.

In FIG. 20, when the moving picture imaging is started, the microcomputer 9 monitors the detected temperature by the temperature sensor 17 and the gain of AGC 5, and judges if these values satisfy formula (3) or not (S1201). Ashen these values satisfy formula (3), the process goes to the correction mode (S1202), and when these values do not satisfy formula (3), the process goes to the non-correction mode (S1203).

In the imaging apparatus of the embodiment, when going to the correction mode, the operation as shown in the flow in FIG. 21 is done. That is, the operation is same as in the imaging apparatus in the fifth embodiment.

On the other hand, when going to the non-correction mode, the operation as shown in the flow in FIG. 22 is done. That is, in the imaging apparatus of the fifth embodiment, such an operation is done that the correction signal is not generated, nor stored, and image data is not corrected (S1205). In this case, since generation of the correction signal is not needed, the imaging time is shorter than in the apparatus in the fifth embodiment. Since no correction is made, noise is not newly generated due to random noise component which is not eliminated completely by the low pass filter process.

Ninth Embodiment 9-1 Outline of Imaging Apparatus

This embodiment relates to the imaging apparatus for correcting also the image data in still picture imaging operation by using the correction signal in moving picture imaging operation.

Generally, the transfer fixed noise component in moving picture imaging operation and transfer fixed noise component in still picture imaging operation do not coincide with each other. This is because the transfer fixed noise component is a constant during the moving picture imaging operation, but it is variable during the still picture imaging operation. The reason why the transfer fixed noise component is constant during the moving picture imaging operation is that the transfer fixed noise component is larger when the retention time of electric charge in the vertical transfer register 302 is longer and the retention time in the moving picture imaging operation is equal through out the whole image. By contrast, the transfer fixed noise component varies in the still picture imaging, because the electric charge generated in a pixel near the horizontal transfer register 303 is output soon and the retention time is short, whereas the electric charge generated in a pixel far from the horizontal transfer register 303 is not output soon and the retention time is long, and hence the transfer fixed noise component is large. Furthermore, the transfer fixed noise component also varies depending on the vertical transfer speed or the number of vertical transfer registers 302 used in transfer of one pixel.

Hence, the correction signals containing the transfer fixed noise component do not coincide between the moving picture imaging mode and the still picture imaging mode. Further, the correction signal also varies with the gain of the AGC 5.

Thus, the correction signals do not coincide between the moving picture imaging mode and the still picture imaging mode, but at least they are in proportional relation. By making use of this relation, in the embodiment of the invention, the correction signal in the still picture imaging operation is determined from the correction signal in moving picture imaging operation by calculation.

9-2 Configuration of Imaging Apparatus

Figure 23:
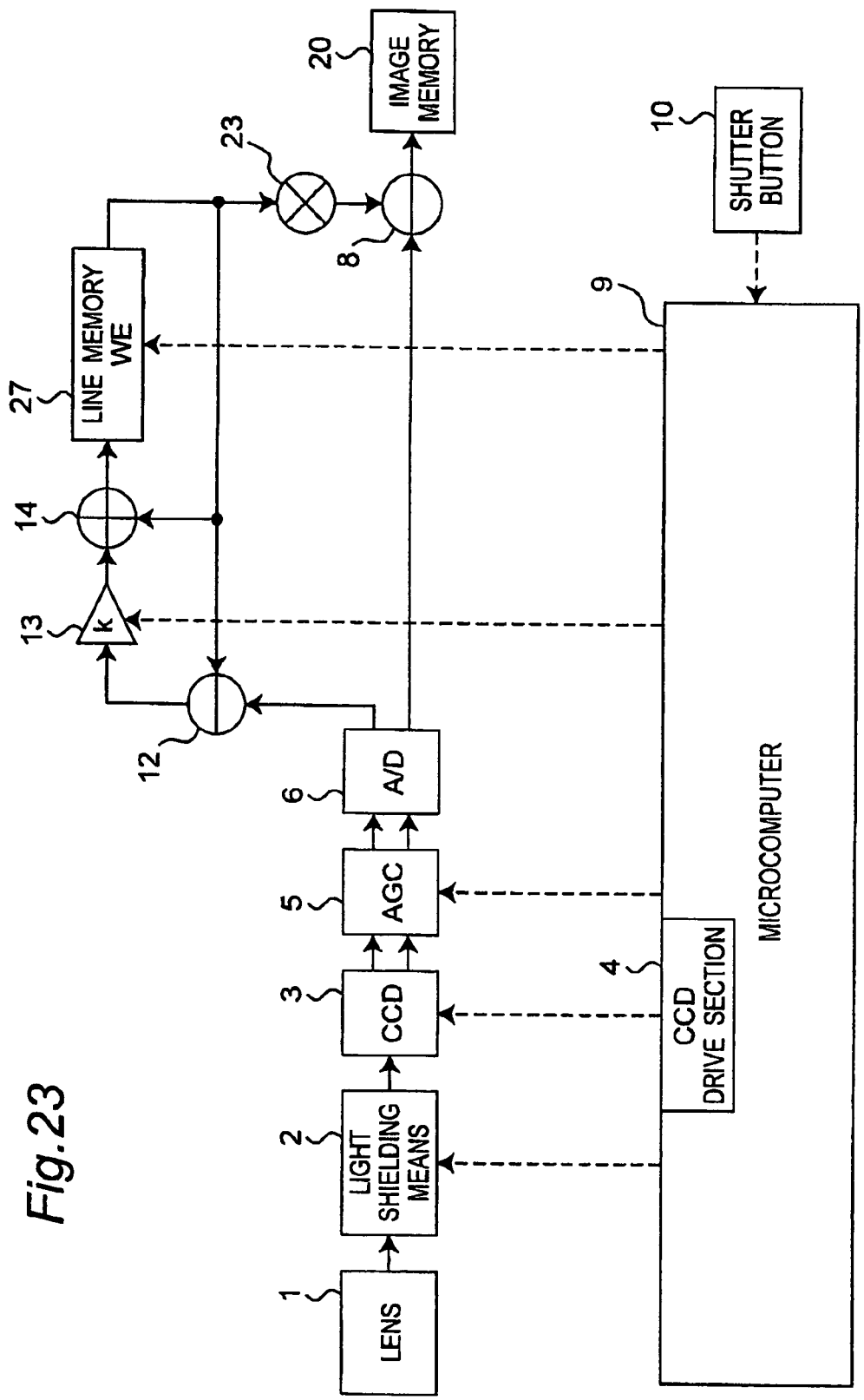
FIG. 23 is a block diagram of configuration of an imaging apparatus in ninth embodiment of the invention.

FIG. 23 is a block diagram of configuration of the imaging apparatus in this embodiment. The imaging apparatus of the embodiment, in addition to the configuration of the imaging apparatus of the fifth embodiment, further includes a multiplier 23 for multiplying the correction signal output from the line memory 27 by a specified value. The multiplier 23 multiplies by 1 in the moving picture imaging operation, and multiplies by a predetermined value in the still picture imaging operation. Multiplying by 1 in the moving picture imaging operation means that the subtractor 8 subtracts the correction value directly from the image data. Multiplying by a predetermined value in the still picture imaging operation means that the subtractor 8 increases or decreasing the correction signal, and subtracts the increased or decreased correction signal from the image data. The predetermined value in the still picture imaging operation is determined by the ratio of magnitude between the level of transfer fixed noise component in the moving picture imaging operation and the level of transfer fixed noise component in the still picture imaging operation.

9-3 Operation of Imaging Apparatus

The operation of the imaging apparatus of the embodiment is explained.

The moving picture imaging operation is explained first. In the moving picture imaging operation, the imaging apparatus of the embodiment multiplies the correction signal by 1 by means of the multiplier 23. At this time, the operation is sane as in the fifth embodiment.

The still picture imaging operation is explained next.

Figure 24:
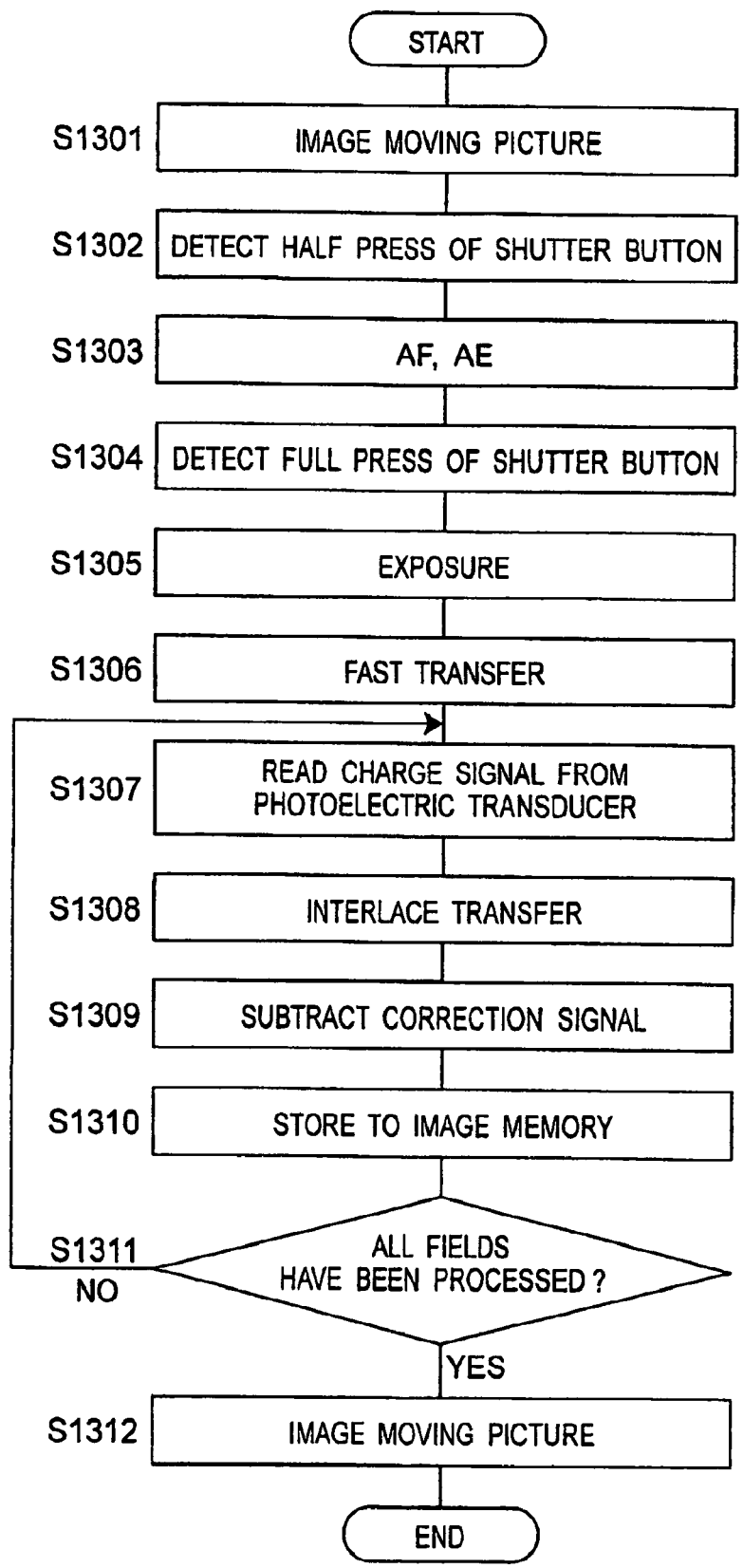
FIG. 24 is a flowchart of operation in still picture shooting mode of imaging apparatus in the ninth embodiment of the invention.

FIG. 24 is a flowchart of the still picture imaging operation. FIGS. 25A to 25G are timing charts of operation timing in this operation. FIG. 25A is a diagram showing the state of the shielding means 2, in which high means exposure state, and low means light-shielded state. FIG. 25B is a timing diagram of reading out electric charge from the photoelectric transducer 301 into the vertical transfer register 302, in which high means reading. FIG. 25C is a timing diagram of interlace transfer in the vertical transfer register 302, in which high means interlace transfer. FIG. 25D is a timing diagram of the fast transfer in the vertical transfer register 302, in which high means fast transfer. FIG. 25E is a diagram of values of the transfer fixed noise component of any one row in one image, schematically shown by representing one image. FIG. 25F shows a write enable (WE) signal for the field memory 7, and the field memory 7 stores the input signal when it is high.

FIG. 25G is a diagram showing operation state of the imaging apparatus of the fifth embodiment. Period up to time T11 is a period for imaging a moving picture. A period of time T12 to T19 is a period for imaging a still picture. A period of time T12 to T13 is a period of exposure operation. Time T14 to T16 is a dummy yield period, that is, a period for stabilizing the transfer fixed noise component in a still picture to a constant value. Times T16 to T17, T17 to T18, and T18 to T19 are respectively first, second and third field periods, that is, the periods of generating, correcting and storing image data of first to third fields.

9-3-1 Transition Period from Moving Picture Imaging Operation to Still Picture Imaging Operation The period us to time T11 is ordinary moving picture imaging operation (S1301). As mentioned in the fifth embodiment, in this period, the write enable signal is output to the line memory 27, and the correction signal is updated (T10 to T11).

In this embodiment, at tire T11, when receiving an operation signal indicating the shutter button 10 half pressed by the user (S1302), the microcomputer 9 prepares for still picture imaging by carrying out automatic focusing control (AF) or automatic exposure control (AE) (S1303).

9-3-2 Exposure Period

At time T12, when receiving an operation signal indicating the shutter button 10 fully pressed by the user, the microcomputer 9 controls, as shown in FIG. 25A, the shielding means 2 to set in exposure state (S1305). The exposure continues up to time T13, and when exposure is oven, the microcomputer 9 controls the shielding means 2 to set in light-shielded state. Later, the CCD drive section 4 controls the CCD image sensor 3 for starting fast transfer for sweeping out the dark current accumulated in the vertical transfer register 302 during the exposure period (S1306, T14 to T15 in FIGS. 25A to 25G).

Herein, the fast transfer is a transfer method of driving the vertical transfer register 302 at high speed in order to sweep out smear or dark current occurring in the vertical transfer register 302 during the exposure period.

9-3-3 Dummy Field Period

Dummy field period is explained next. The period goes to dummy field period by the fast transfer (T14). When the fast transfer is finished (T15), the vertical transfer register 302 is driven with interlace transfer in order to output signal charge for one field (T15 to T16). In this vertical transfer, electric charge generated in the photoelectric transducer 331 may be read out to the vertical transfer register 302, or may not be read out. The signal thus obtained contains the transfer fixed noise component. The value of the transfer fixed noise component gradually. Increases as shown in FIG. 25E, but the value becomes constant at the moment of interlace transfer for one field, that is, after ordinary vertical transfer for all of stages of vertical transfer registers 302 is completed (T16). The reason is specifically explained below.

Before time T16, since the retention time in the vertical transfer register 302 varies depending on the position of pixels (row), and the value of the transfer fixed noise component increases as the time passes. After time T16, however, since the retention time is constant regardless of position of pixels (row), the value of the transfer fixed noise is constant.

Dummy field period is not intended to generate a correction signal, but is intended to set constant the level of the transfer fixed noise component. In this embodiment, in still picture imaging operation, the level of the transfer fixed noise component is h2, and the level of the transfer fixed noise component is h1 in the moving picture imaging operation.

9-3-4 First to Third Field Periods

After the dummy field period, the CCD drive section 4 drives the CCD image sensor 3 to read out signal charge from the photoelectric transducer 301 to the vertical transfer register 302 without executing the fast transfer (S1307, time T16 in FIGS. 25A to 25G). Thus, in the still picture imaging operation, after driving the vertical transfer registers 302 for the total number of transfer stages of the image at the same constant speed, the vertical transfer registers 302 are successively driven at the same speed. That is, the time from previous charge sweeping to present charge sweeping is constant throughout all pixels in one image, so that the transfer fixed noise component in the still picture imaging operation can be constant. For this purpose, it is required to obtain the image data by way of no fast transfer mode which drives the vertical transfer register 302 at high speed, after once starting the still picture imaging operation. As a result, the ratio is kept constant between the level h1 of the transfer fixed noise component in the moving picture imaging operation and the level h2 of the transfer fixed noise component in the still picture imaging operation.

The image data output by driving of the CCD image sensor 3 is input to the subtractor 8 (S1308). The subtractor 8 subtracts the correction signal read out from the line memory 27, from the input image data (S1309).

At this time, as a correction signal for subtraction, the correction signal used in the moving picture imaging operation is also used in the still picture imaging operation. The same signal is used in each line. However, between the still picture imaging operation and the moving picture imaging operation, the level of transfer fixed noise component is different, (in this embodiment, it is h2 in the still picture imaging operation, and h1 in the moving picture imaging operation), and thus the level of the correction signal is also different. Accordingly, in the still picture imaging operation, the correction signal output from the line memory 27 is not used directly, but it is multiplied by a predetermined coefficient in the multiplier 23 to obtain the correction signal, and it is subtracted from the image data by the subtractor 8. The predetermined coefficient may be, for example, h2/h1.

When subtracted by the subtractor 8, finally, the image from which noise is removed is stored in the image memory 20 (S1310).

After thus processing the image data of one field, the microcomputer 9 checks if the processing is done in the image data of one frame, that is, image data of three fields (S1311). If processing of whole field is not finished yet, the process returns to step S1307, and the image data of the second field and third field are generated, corrected and stored (T17 to T18, T18 to T19 in FIGS. 25A to 25G). On the other hand, when processing of whole field is finished (when processing of the third field is finished), the still picture imaging process is terminated, and the process returns to the moving picture imaging process (S1312, time T19).

9-4 Summary

In this embodiment, as described herein, a still picture can be imaged as well as a moving picture. In the embodiment, the multiplier 23 is provided for multiplying the correction signal generated by the low pass filter and stored in the line memory 27 in the moving picture imaging operation, by a predetermined value to generate a correction signal for a still picture imaging operation. The subtractor 8 subtracts the correction signal for the still picture from the image data output by image data output operation, in the still picture imaging operation. Accordingly, in the still picture imaging operation, the image data can be corrected by using the correction signal used in the moving picture imaging operation, and thus it is not required to generate correction signal newly for still picture imaging. Therefore, according to the imaging apparatus of the embodiment, since the time for generating correction signal is not needed, the time for still picture imaging operation can be shortened.

Tenth Embodiment

In the ninth embodiment, electric charge generated in any region of reading region 304 and dummy region 307 in FIG. 2 is used as a dummy signal, and the correction signal is generated on the basis of this. In this embodiment, by contrast, electric charge generated in the reading region 304 is not used as a dummy signal, but electric charge generated in the dummy region 307 is used as a dummy signal. In the dummy region 307, photoelectric transducers 301 do not exist, and only vertical transfer registers 302 exist, and hence mixing of the element noise component in the dummy signal can be securely prevented. Therefore, as the object of the invention, the transfer fixed noise component can be securely reduced.

The configuration of the imaging apparatus of the embodiment is same as that of the imaging apparatus in the fifth embodiment. The operation of the imaging apparatus in this embodiment is explained by referring to FIGS. 26A to 26G.

FIGS. 26A to 26G are timing charts of operation timing of the imaging apparatus in this embodiment. Since the dummy region 307 is near the horizontal transfer register 303, when the reading pulse is transmitted, the CCD image sensor 3 immediately outputs a dummy signal. The low pass filter generates a correction signal on the basis of the dummy signal, and the line memory 27 stores the generated correction signal. Accordingly, right after transmission of reading pulse (time T21), the write enable signal becomes high.

Other operation is same as in the imaging apparatus or the fifth embodiment.

Thus, in this embodiment, the CCD image sensor 3 is configured to include the reading region 304 in which signal charge can be read from the photoelectric transducer 301, and the dummy region 307 in which signal charge can not read from the photoelectric transducer 331. In the dummy region 307, the vertical transfer register 302 is driven, and electric charge generated in the dummy region 307 is obtained as a dummy signal, and a correction signal is generated on the basis of this dummy signal.

According to this configuration, in the dummy region 307, the photoelectric transducer 301 does not exist, and only the transfer vertical register 302 exists, so that mixing of the element noise in the dummy signal can be securely prevented.

Eleventh Embodiment

Several modified examples of fifth to tenth embodiments are explained.

i) In fifth to tenth embodiments, as shown in formula (1), weighted averaging is processed by heavily weighing the dummy signals of pixels in lower part of the image. But averaging with equal weight may be processed on all signals. Thus, by weighting equally, the effect of suppressing random noise is greater, and the number of lines of dummy signals necessary for generating a correction signal may be curtailed.

ii) In the tenth embodiment, during the still picture imaging operation, the microcomputer 9 controls the start of generation of the correction signal to be made after the transfer fixed noise component of dummy signal becomes constant. But it may be also designed to make the start of generation of the correction signal before the transfer fixed noise component of the dummy signal becomes constant. As a result, the converging speed of IIR filter can be accelerated. Hence, the necessary imaging time is further shortened.

iii) In the tenth embodiment, during the still picture imaging operation, right after light-shielding, the fast transfer is started in order to sweep out smear charge, but this fast transfer may be omitted. When the fast transfer is omitted, in the period of gradual increase of transfer noise, smear charge can be swept out. In this case, since sweeping of smear charge and constant controlling of transfer fixed noise can be processed in parallel, the imaging time can be shortened accordingly.

iv) In the eighth embodiment, it is determined whether or not to correct depending on the temperature and gain, but it may be determined on the basis of either temperature or gain.

v) In the eighth embodiment, magnitude of correction signal for correction may be increased or decreased depending on the temperature and/or gain. In this case, as the magnitude of temperature and/or gain increases, the magnitude of correction signal is increased for enhancing noise elimination effect. However, upper and lower limits may be provided in the magnitude of the correction signal, and a region not increasing or decreasing the magnitude of the correction signal may be provided even if the temperature and/or gain magnitude changes. Correlation of temperature and/or gain magnitude and magnitude of correction signal may be expressed by linear function or other function. Further, hysteresis may be provided for increase or decrease of magnitude of the correction signal. Specifically, an amplifier is provided between the line memory 27 and subtractor 8, and the gain of this amplifier may be controlled by the microcomputer 9.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent application Nos. 2004-243351 (filed on Aug. 24, 2004) and 2004-246708 (Filed on Aug. 26, 2004), which are expressly incorporated herein by reference in its entirety.

INDUSTRIAL APPLICABILITY

The invention is capable of reducing noise due to random noise which is contained in a correction signal for correcting image data and is generated newly when correcting the image data. The invention is hence applicable to a digital still camera, a video camcorder, a monitoring camera, a portable telephone terminal with a camera, and other electronic appliances having camera function.

What is claimed is:

1. An imaging apparatus comprising:
an imaging section that has a plurality of photoelectric transducers arranged in matrix, and a plurality of vertical transfer registers each of which is disposed adjacently to each row of photoelectric transducers for transferring transducer signal charge from the photoelectric transducer,
a light shielding section which is controlled to expose the imaging section to photons during an exposure period, and shield the imaging section from photons after the exposure period,
a controller configured to:
 a) drive the vertical transfer registers to remove a first signal charge accumulated by the vertical transfer register during the exposure period, and
 b) drive the vertical transfer registers to obtain a correction signal after the exposure period, the correction signal including a second signal charge accumulated by the vertical transfer register after the removal of the first signal charge,
wherein the correction signal excludes the transducer signal charge accumulated by the photo-electric transducers electrically coupled to the driven vertical transfer registers,
a storage section that stores the correction signal, and
a subtractor that subtracts the correction signal from image data obtained by driving the vertical transfer registers with the transducer signal charge read out from the photoelectric transducers to vertical transfer registers.

2. The imaging apparatus of claim 1, wherein the imaging section divides one frame of the image data into a plurality of fields, and outputs an image signal in each field, and
the correction signal is obtained by driving the vertical transfer register for a period of one field.

3. The imaging apparatus of claim 2, wherein capacity of the storage section is larger than capacity corresponding to one field of image data, and smaller than capacity corresponding to two fields of image data.

4. The imaging apparatus of claim 1, wherein the storage section is a line memory that stores one line of image signal obtained by driving the vertical transfer registers without reading out the signal charge from the photoelectric transducers to vertical transfer registers, as a correction signal, and
the correction signal is obtained by driving the vertical transfer register at a constant speed, and further driving the vertical transfer register at the same speed as when the correction signal is obtained, successively after driving the vertical transfer register for obtaining the correction signal.

5. The imaging apparatus of claim 4, wherein the correction signal for one line are obtained by average or weighted average of dummy signals of a plurality of lines which are obtained by driving the vertical transfer register without reading out the signal charge from the photoelectric transducer to the vertical transfer register.

6. The imaging apparatus of claim 1, further comprising a temperature sensor for detecting temperature and/or a gain controller for controlling a gain of output of the imaging section,
wherein the subtractor determines necessity of correction of image data by the correction signal, on the basis of the temperature detected by the temperature sensor and/or the gain controlled by the gain controller.

7. The imaging apparatus of claim 1, further comprising a temperature sensor for detecting temperature and/or a gain controller for controlling a gain of output of the imaging section,
wherein the magnitude of the correction signal is increased or decreased depending on the temperature detected by the temperature sensor and/or the gain controlled by the gain controller.

8. The imaging apparatus of claim 1, having a continuous shooting mode of shooting a plurality of frames of image data continuously,
wherein in the continuous shooting mode, as a correction signal for subtracting from the image data of the present frame, the correction signal used in the previous frame is used.

9. A correction method of image data in an imaging apparatus having an imaging section including a plurality of photoelectric transducers disposed in matrix, and a plurality of vertical transfer registers each of which is disposed adjacently to each row of photoelectric transducers for transferring transducer signal charge from the photoelectric transducers, the correction method comprising:
exposing the imaging section to photons during an exposure period;
shielding the imaging section from photons after the exposure period;
driving the vertical transfer registers after the exposure period to remove a first signal charge accumulated by the vertical transfer registers during the exposure period;
driving the vertical transfer registers after the exposure period to obtain a correction signal, the correction signal including a second signal charge accumulated by the vertical transfer registers after removal of the first signal charge;

wherein the correction signal excludes the transducer signal charge accumulated by the photoelectric transducers electrically coupled to the driven vertical transfer registers;

driving the vertical transfer registers with the transducer signal charge read from the photoelectric transducers to vertical transfer registers, thus to obtain the image data; and subtracting the correction signal from the image data.

10. An imaging apparatus comprising:

an imaging section that has a plurality of photoelectric transducers arranged in matrix, and a plurality of vertical transfer registers each of which is disposed adjacently to each row of photoelectric transducers for transferring transducer signal charge from the photoelectric transducer, a light shielding section which is controlled to expose the imaging section to photons during an exposure period, and shield the imaging section from photons after the exposure period, a controller configured to:
 a) drive the vertical transfer registers to remove a first signal charge accumulated by the vertical transfer register during the exposure period, and
 b) drive the vertical transfer registers to obtain a correction signal after the exposure period, the correction signal including a second signal charge accumulated by the vertical transfer register after the removal of the first signal charge, wherein the correction signal excludes the transducer signal charge accumulated by the photo-electric transducers electrically coupled to the driven vertical transfer registers, and a correction section that corrects image data based on the obtained correction signal.

11. A correction method of image data in an imaging apparatus having an imaging section including a plurality of photoelectric transducers disposed in matrix, and a plurality of vertical transfer registers each of which is disposed adjacently to each row of photoelectric transducers for transferring transducer signal charge from the photoelectric transducers, the correction method comprising:

exposing the imaging section to photons during an exposure period;

shielding the imaging section from photons after the exposure period;

driving the vertical transfer registers after the exposure period to remove a first signal charge accumulated by the vertical transfer registers during the exposure period;

driving the vertical transfer registers after the exposure period to obtain a correction signal, the correction signal including a second signal charge accumulated by the vertical transfer registers after removal of the first signal charge, wherein the correction signal excludes the transducer signal charge accumulated by the photoelectric transducers electrically coupled to the driven vertical transfer registers;

driving the vertical transfer registers with the transducer signal charge read from the photoelectric transducers to vertical transfer registers, thus to obtain image data; and correcting the image data based on the obtained correction signal.

* * * * *